United States Patent
Wu et al.

(10) Patent No.: US 6,263,344 B1
(45) Date of Patent: Jul. 17, 2001

(54) METHOD AND APPARATUS FOR PROCESSING HYPERTEXT OBJECTS ON OPTICAL DISC PLAYERS

(76) Inventors: Bo Wu; Ling Lu, both of 1432 De Falco Way, San Jose, CA (US) 95131; Jing Wu; Ginohong Xu, both of 100 Buckingham Ave. #222, Santa Clara, CA (US) 95051

( * ) Notice: Subject to any disclaimer, the term of this patent is extended or adjusted under 35 U.S.C. 154(b) by 0 days.

(21) Appl. No.: 09/156,962

(22) Filed: Sep. 18, 1998

Related U.S. Application Data

(60) Provisional application No. 60/059,580, filed on Sep. 18, 1997.

(51) Int. Cl.$^7$ .................................................. G06F 17/30
(52) U.S. Cl. .......................... 707/104; 707/513; 707/523
(58) Field of Search ................................ 707/3, 4, 104, 707/513, 526, 523

(56) References Cited

U.S. PATENT DOCUMENTS

| | | | |
|---|---|---|---|
| 5,909,551 | * 6/1999 | Tahara et al. | 360/27 |
| 5,991,798 | * 11/1999 | Ozaki et al. | 709/217 |
| 6,029,182 | * 2/2000 | Nehab et al. | 707/523 |
| 6,034,963 | * 3/2000 | Minami et al. | 370/401 |
| 6,047,292 | * 4/2000 | Kelly et al. | 707/104 |
| 6,052,780 | * 4/2000 | Glover | 713/193 |

* cited by examiner

Primary Examiner—Jean R. Homere
(74) Attorney, Agent, or Firm—Claude A. S. Hamrick; Justin Boyce; Oppenheimer Wolff & Donnelly LLP

(57) ABSTRACT

A method for retrieving, decoding, and processing codes in an intermediate language generated from object specifying languages such as HTML and JAVA is disclosed. The codes in the intermediate language are decoded and processed on a minimally featured and minimally powered machine to generate a screen of information with selections thereon for the user. The file corresponding to the chosen selection is retrieved, decoded, processed, and displayed to the user again for selection. Codes in a simple scripting language are also provided to facilitate the processing of commands.

28 Claims, 11 Drawing Sheets

```
VCD _ _ MPEGAV
      _ CDDA
      _ SEGMENT
      _ KARAOKE
      _ EXT
      _ CDI
      _ DATA
          I_ VCD-ROM

PROGRAM
      _ PUB_DATA
            I_ FONT LIBRARY
            I_ OTHER SYSTEM DATA

_ ESS3210 : AUTORUN.EXE
      _ ESS3308 : AUTORUN.EXE
      _ Other Decoder Chips : AUTORUN.EXE
      _ JAVA : AUTORUN.EXE
```

METHOD AND APPARATUS FOR PROCESSING HYPERTEXT OBJECTS ON OPTICAL DISC PLAYERS

CLAIM OF PRIORITY

This application claims priority to a first regular US application entitled "System and Process for Object Rendering on Thin Client Platforms" filed on Sep. 3, 1997, bearing Ser. No. 08/922,898 now U.S. Pat. No. 5,987,256; and to a second regular US application entitled Compact Disc Controllable Machines Containing a Dual Processing System" filed on Sep. 2, 1997, bearing Ser. No. 08/922,064 now abandoned; and to a provisional application entitled "Method and Apparatus for Processing Hypertext Objects on Thin Client Platforms Including DVD/VCD Players", filed on Sep. 18, 1997 bearing file No. 60/059,580. These applications are hereby incorporated by reference.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

The present invention relates generally to methods and apparatus for providing codes describing hypertext objects in an intermediate language, and more particularly, to methods, systems, and apparatus for decoding said codes in an intermediate language on devices with limited computing power and resources.

2. Description of the Prior Art

Programs and data files written in standard object specifying languages such as HTML and JAVA require a large amount of computing power and resources in order to operate at an efficient level. These programs and data files are typically executed on personal computer (or more powerful) platforms.

In order to have a device that can process files written in these object specifying languages and at the same time minimize the manufacturing cost of these devices, the device and the associated software would have to be modified and streamlined for hardware with limited power and capabilities. Prior art methods and systems generally achieve this goal by minimizing or eliminating certain standard features or functionalities. A user of such systems or methods cannot therefore benefit from the full functionalities provided by the object specifying languages.

Although, one prior art technology provides for Video-CDs (VCDs) and VCD players. Such players are generally limited function appliances, where it can only play VCD discs and not much more. It would be desirable to add additional capabilities to these players since the requisite hardware for processing object specifying language programs and data files is already in place.

SUMMARY OF THE INVENTION

It is therefore an object of the present invention to provide a system having minimal computing power, peripherals, and resources and yet capable of efficiently processing codes written in an object specifying language such as programs and data files written in HTML and JAVA.

It is another object of the present invention to provide a method for decoding codes describing objects in an intermediate language on a system with minimal computing resources.

It is yet another object of the present invention to provide a method for processing codes in a simple scripting language on a system with minimal computing resources.

Briefly, a presently preferred embodiment of the present invention provides a method for retrieving, decoding, and processing codes in an intermediate language generated from object specifying languages such as HTML and JAVA. The codes in the intermediate language are decoded and processed to generate a screen of information with selections thereon for the user. The file corresponding to the chosen selection is retrieved, decoded, processed, and displayed to the user again for selection. Codes in a simple scripting language are also provided to facilitate the processing of commands, and the codes can be embedded in the files or stored as separate files.

As part of a presently preferred embodiment of the present invention, a system having the capability to play back a CD/VCD or other types of media format (physical, optical format and/or software format) and the capability to perform a large variety of functions is disclosed. The system can be a dual processor system where one processor is a digital signal processor (DSP) having its operations controlled by another processor, such as a RISC processor.

An advantage of the present invention is that it provides a system having minimal computing power, peripherals, and resources and yet capable of efficiently processing codes written in an object specifying language such as programs and data files written in HTML and JAVA.

Another advantage of the present invention is that it provides a method for decoding codes describing objects in an intermediate language on a system with minimal computing resources.

Yet another advantage of the present invention is that it provides a method for processing codes in a simple scripting language on a system with minimal computing resources.

These and other features and advantages of the present invention will become well understood upon examining the and reading the following detailed description of the invention.

IN THE DRAWINGS

Figure 8A:
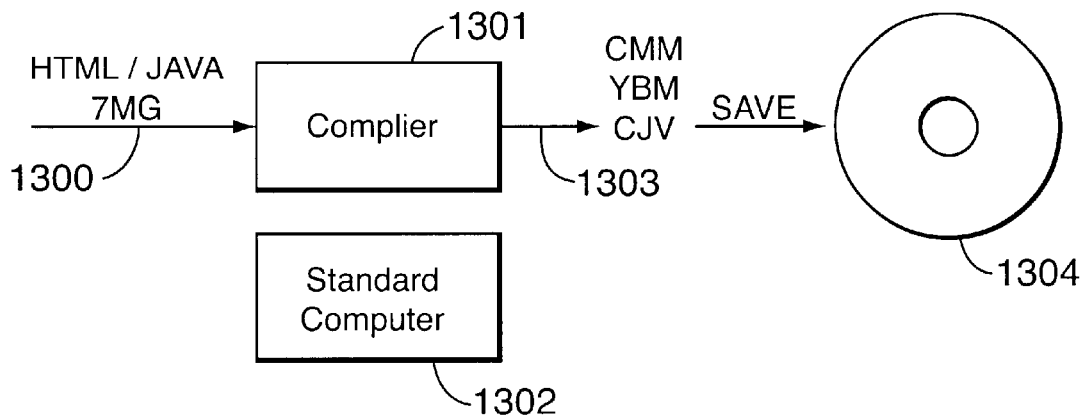
FIG. 8A is a schematic diagram illustrating use of the present invention in an off-line environment for producing a compiled format of the present invention and saving it to a storage medium.
Figure 8B:
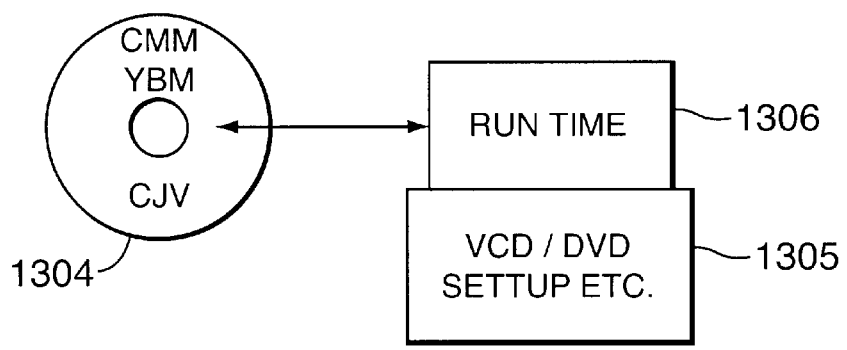

FIG. 8B illustrates the "Surf_HTML" process of step 110 in FIG. 8A. This process starts at point 1200. The first part is initialization step 1210. A display routine is executed at step 1220 having a fixed coordinate functions of the recomplied HTML data set. First, the process determines whether applets are included in the file (step 1230). If they are included, then the applet is executed (step 1235). If no applets are included or after the execution of the applet, then a refresh flag is tested (step 1240). If the flag is equal to 1, then it is tested whether a timeout has occured (step 1250). If a timeout has occured, then the current page is updated (step 1260) and the process returns to set 1210 of FIG. 8B, for example.

Figure 9:
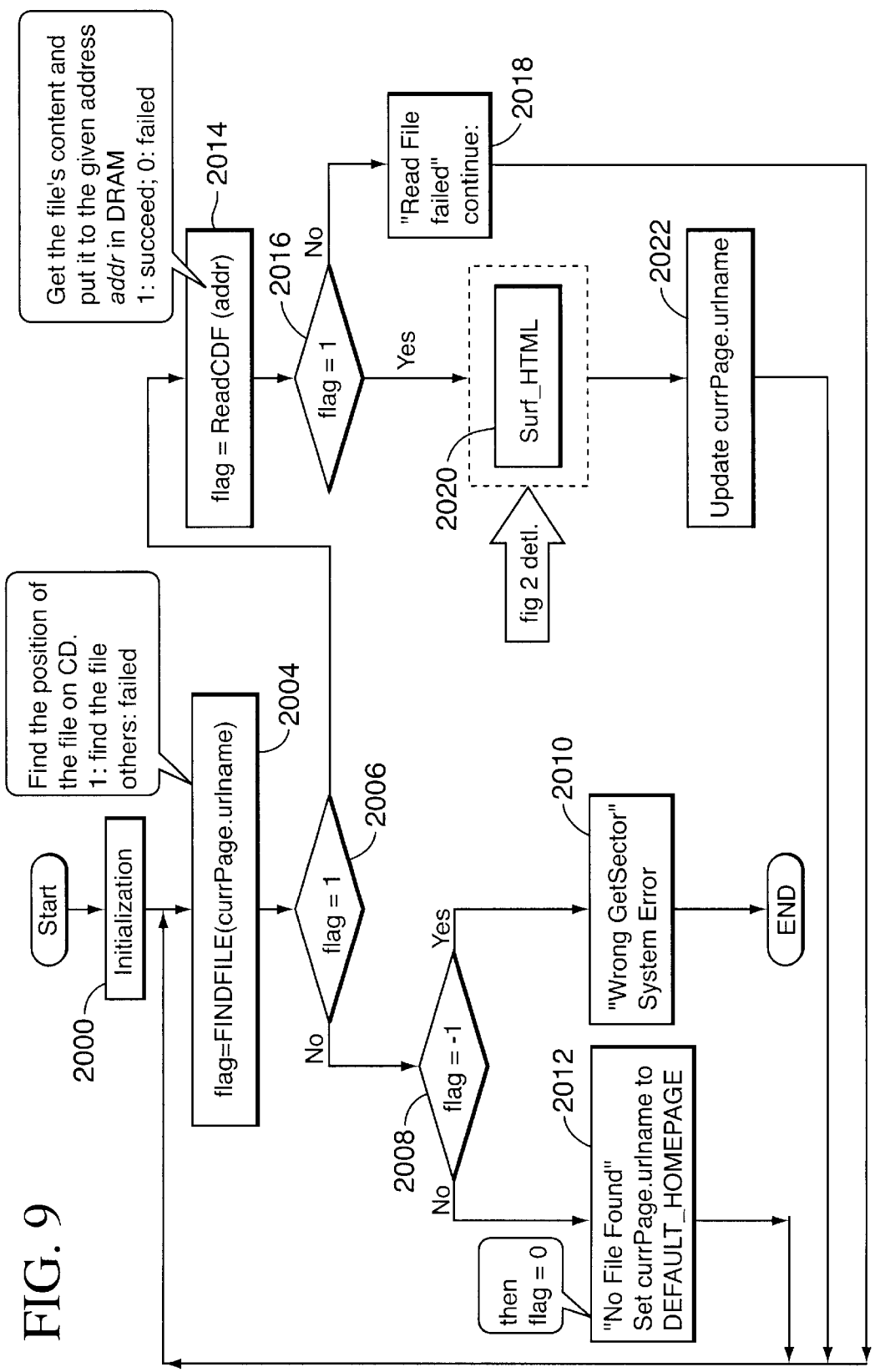

FIG. 9 illustrates the processing steps in retrieving and processing a file containing codes in the intermediate language.

Figure 10:
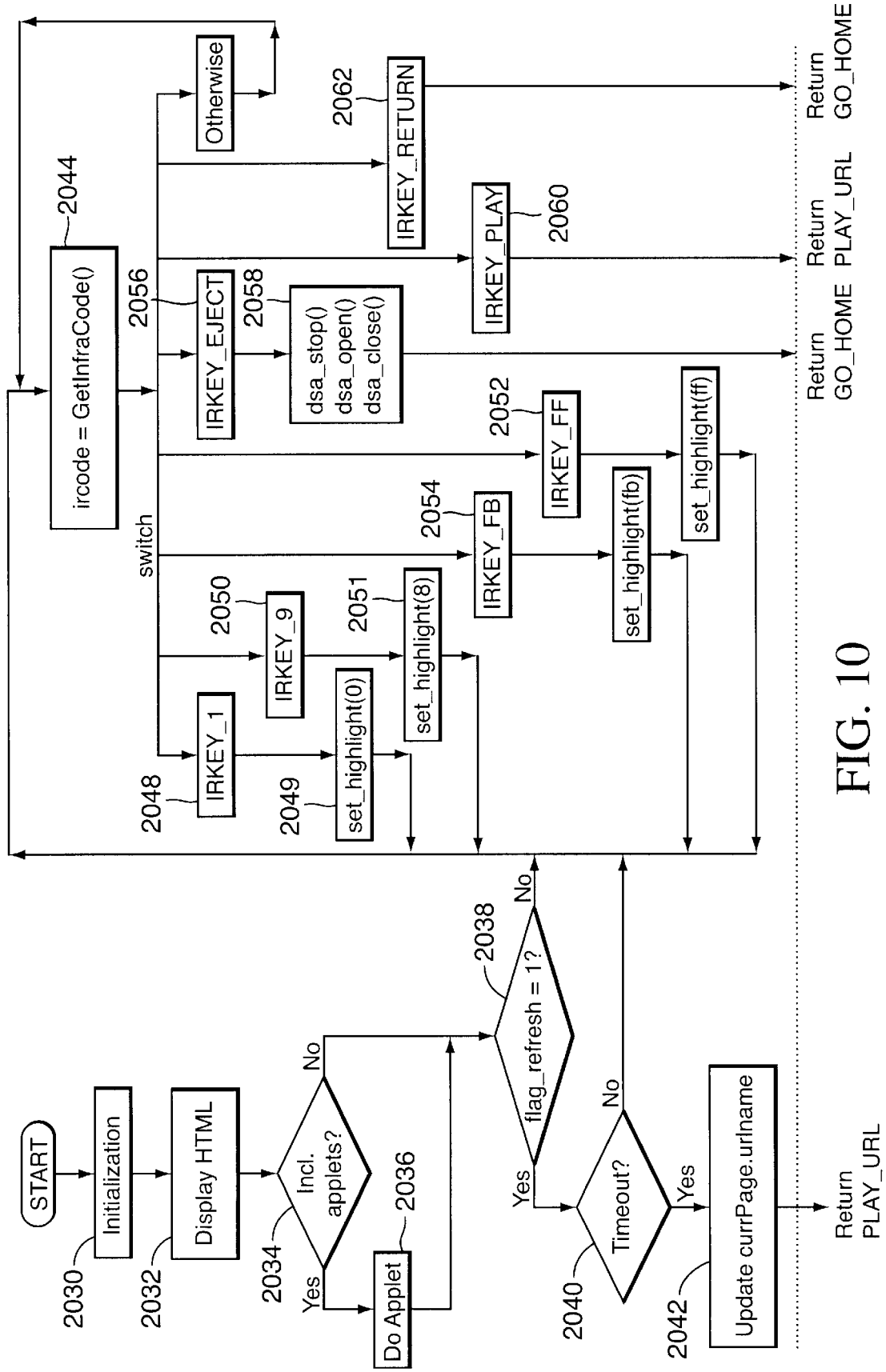

FIG. 10 illustrates the processing steps in interacting with user input and activating the corresponding selection.

Figure 11:
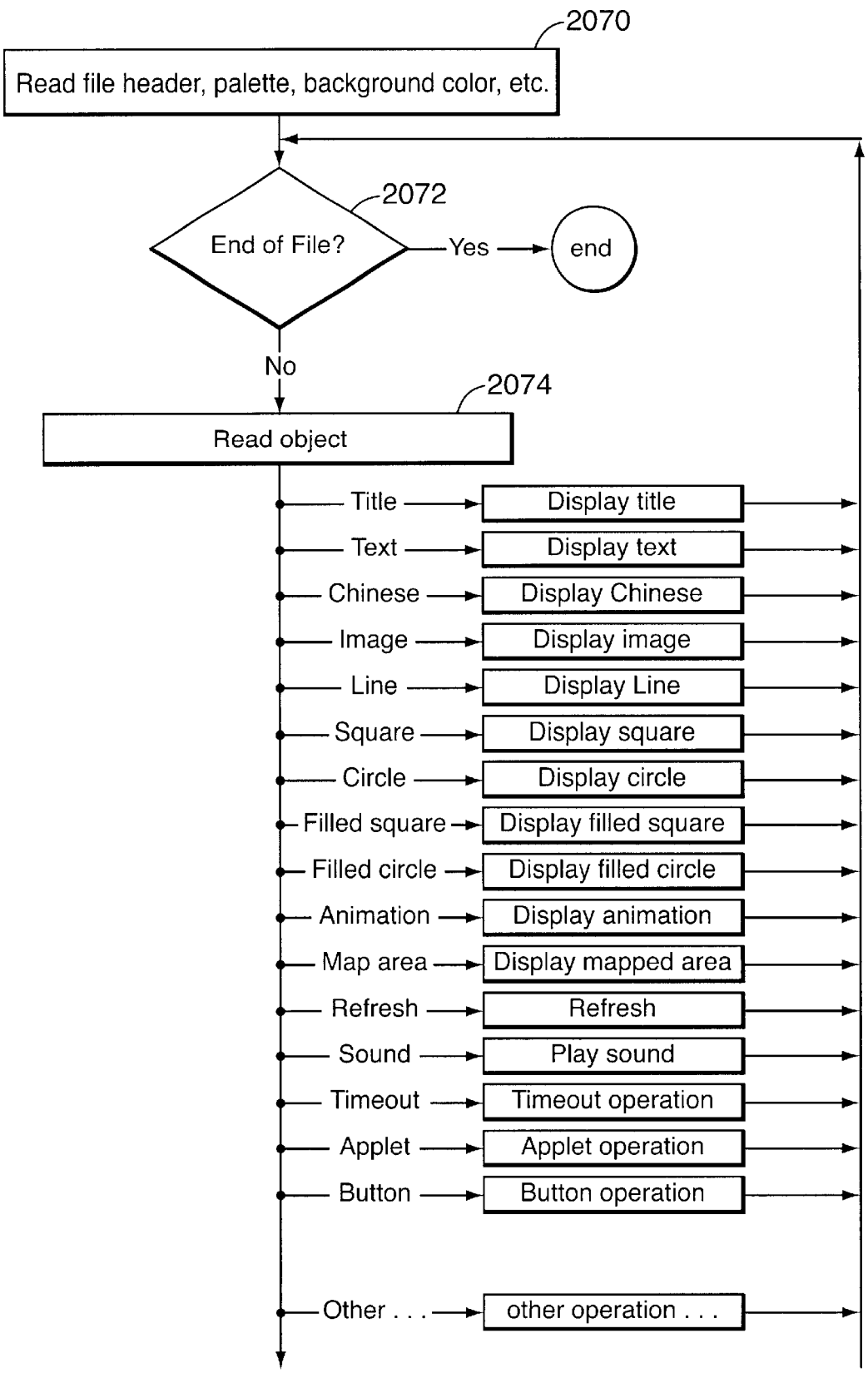

FIG. 11 illustrates the processing steps in processing a retrieved file and the objects therein.

DETAILED DESCRIPTION OF THE PREFERRED EMBODIMENTS

Description of the Hardware

Figure 1:
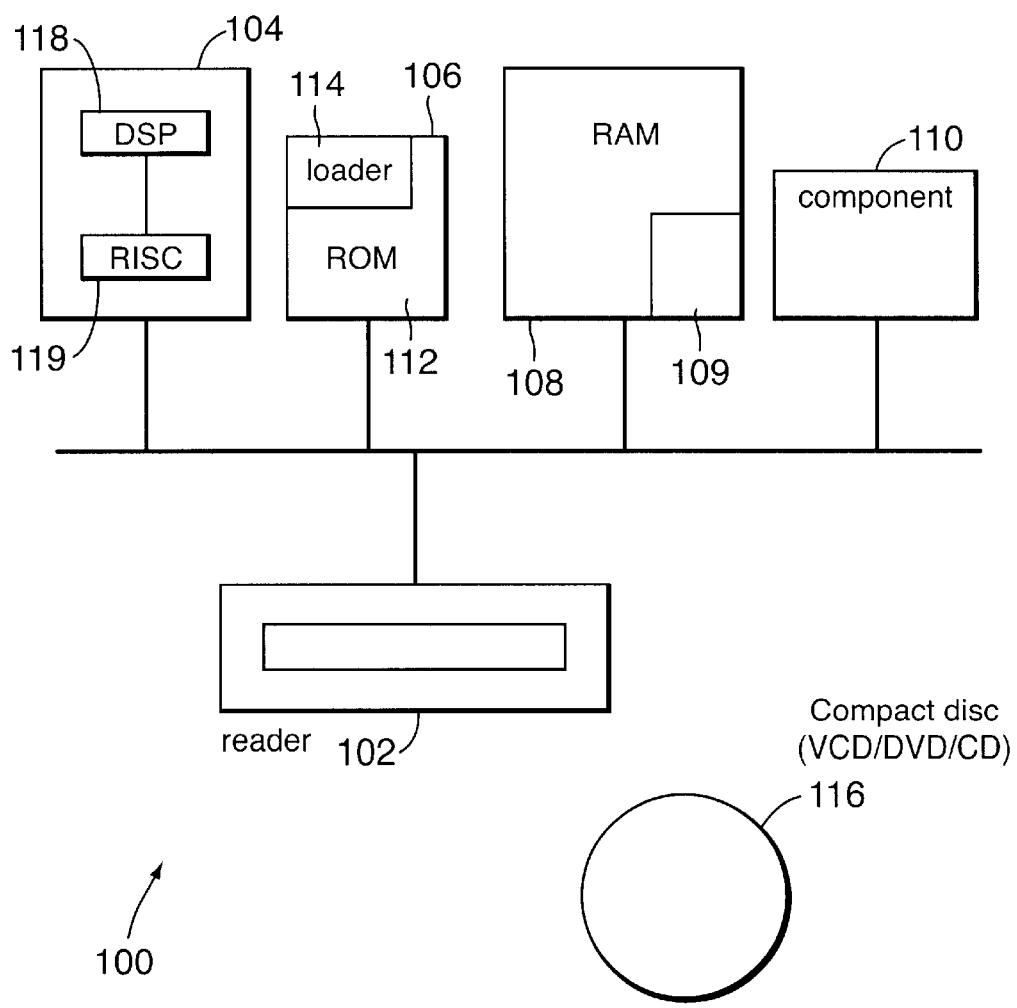
FIG. 1 is a schematic diagram showing a system of the present invention.

FIG. 1 is a schematic diagram showing a system 100 of the present invention. As an example to illustrate the present invention, system 100 is designed as a video compact disk (VCD) player modified by the present invention. System 100 comprises a VCD reader 102 connected to a dual processor system 104, a read-only memory (ROM) 106, a random access memory (RAM) 108, and a component 110 that enable system 100 to perform its intended VCD function. For example, component 110 contains audio decoder and video decoder circuitry for generating the necessary video and audio signals to be connected to a television and an amplifier. The dual processor system 104 contains a digital signal processor (DSP) 118 and a processor 119. Processor 119 could be a RISC or a regular processor. It should be noted that the DSP 118, processor 119 and ROM 106 could be incorporated into a single integrated circuit ("IC") or separate ICs. Under a conventional mode of operation, system 100 is used to play movies recorded on a VCD.

In system 100, RAM 108 contains a logical area 109 for storing instructions that may change the characteristics of DSP 118. In the present invention, these instructions are called DSP-modification codes. As example of a processor that can be used in a dual processor system is a chip called the New Media Processor ("NMP") made by Sharp Corporation. The NMP chip can be used as a 3-D graphics engine, TV-signal processing engine, or DVD decoding engine, depending on the DSP-modification codes executed by the NMP. When the DSP-modification codes are executed, the characteristics of the DSP can be changed. Further, any firmware in the NMP can also be changed. A more detailed description of the Sharp NMP can be found in EE Times, Nov. 26, 1996, pages 1 and 6.

ROM 106 contains a portion 112 for storing a conventional program that controls the operation of VCD reader 102 and component 110. The conventional program portion 112 is similar to prior art program (e.g., firmware) found in regular VCD players. ROM 106 also contains a loader portion 114 for storing a loader that can be instructed to load the DSP-modification codes stored in a VCD into RAM 108.

In operation, a user inserts a VCD 116 into VCD reader 102. The loader in the loader portion 114 determines whether the data in the VCD is purely regular VCD data or contains DSP-modification codes. If the data is purely VCD data, operation is transferred to the conventional program stored in the conventional program portion 112, and the system 100 now functions as a VCD player. If the data contains DSP-modification codes, the loader then loads the codes into portion 109 of RAM 108. Upon executing the loader, system 100 is turned into a device that is functionally different from a regular VCD player. If the data on the VCD is neither VCD data nor DSP-modification codes, the user is informed of the error.

In the present invention, a VCD that contains DSP-modification codes is referred to as a loadable VCD. The VCD may also contain applications and other programs. The combination of DSP-modification codes and these other programs is called "executable program."

One advantage of the system of the present invention is that the same player can be configured to provide the functionalities previously provided by many different machines, where the characteristics of these machines are now configured by the DSP-modification codes stored by the optically encoded storage medium that is placed into the reader of the machine.

In one embodiment of the present invention, the executable program contains a boot program and an operating system. The operating system can be considered as a program that controls and allocates computer resources to various application programs. Computer resources handled by the operating system include memory space, file storage space, input/output devices, etc. A boot program is an initial program executed immediately after power is supplied to system 100 or when the system is reset. The boot program initializes all aspects of the system, from processor registers to device controllers to memory contents. Further, the boot program must know how to load and execute the operation system.

There are prior art machines that read application programs recorded on optically encoded discs. However, these optically encoded discs do not contain DSP-modification codes, boot programs and/or operating systems. One advantage of using optically encoded discs is that they are very inexpensive to make. The manufacturing costs and recording costs are much lower than re-writeable media such as floppy diskettes.

As an example, the executable program could contain a game program. In this case, system 100 is transformed into a game deck. The VCD will now be a game player instead of a movie player.

It should be noted that the underlying machine of system 100 does not have to be a VCD player. Any machine that can read some form of optically encoded discs can be used as the underlying machine. Examples are music CD player and digital video disc player. It is to be understood that the VCD is used herein for illustrative purposes only, the present invention is equally applicable to other forms of optically encoded discs.

Figure 2:
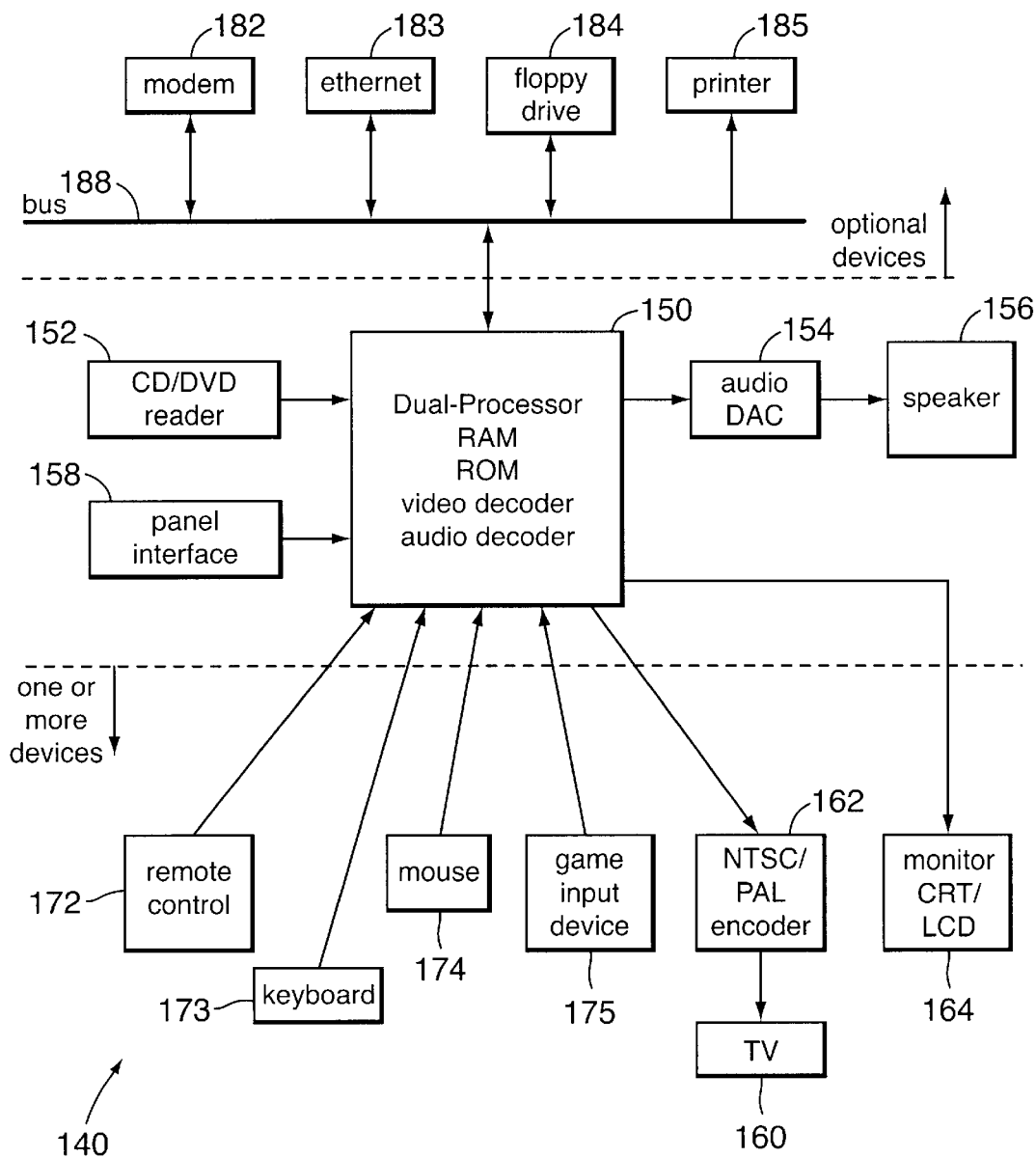
FIG. 2 is a schematic diagram of another embodiment of a system of the present invention.

FIG. 2 is a schematic diagram of another embodiment of a system 140 of the present invention. System 140 comprises a processing unit 150, which includes a dual processor system, ROM, RAM, a video decoder and an audio decoder. Processing unit 150 can be fabricated as a single IC or as several ICs. The RAM contains a portion that can be used to store DSP-modification codes. Data from a reader 152 (which preferably reads CD, VCD, or other compact disc specifications) is sent to processing unit 150. The audio and video data are preferably and typically compressed. The video and audio decoders decompress the data. The decompressed digital audio data is sent to an audio digital-to-analog converter ("DAC") 154 for generating corresponding analog signals. The analog audio signals are sent to a speaker 156. As a result, the user can hear music or voice originally stored on the VCD. System 140 also contains a panel interface 158 allowing users to interact with system 140 through buttons on a front panel.

System 140 may optionally contain a display device, where the display device could be a television 160. In this case, a NTSC/PAL encoder 162 is needed to convert the signals generated by processor unit 150 into signals of a recognized format (NTSC or PAL) that is compatible with the television 160. Alternatively, the display device could be a computer monitor 164, which could be in the form of a liquid crystal display ("LCD") or cathode ray tube ("CRT").

System 140 preferably contains one or more input devices. Examples of such devices are remote control 172, keyboard 173, mouse 174 and game input device (e.g., joystick) 175.

More sophisticated computer-related devices (together with appropriate hardware controllers) can be optionally connected to processor unit 150. Examples are modem 182, ethernet 183, floppy drive 184, and printer 185. The controllers for these devices are preferably coupled to a data bus 188 that is connected to the processor unit 150. An example of a bus architecture is the popular Industrial Standard Architecture bus ("ISA") commonly used in IBM-compatible personal computers.

Similar to ROM 106 of FIG. 1, the ROM in processor unit 150 contains a loader program that can load executable programs recorded on a loadable VCD. These executable programs contain DSP-modification codes. As a result, system 140 can be used to play regular content (e.g., movie or music) or changed to a different machine in accordance with the instructions on the VCD.

Figure 3:
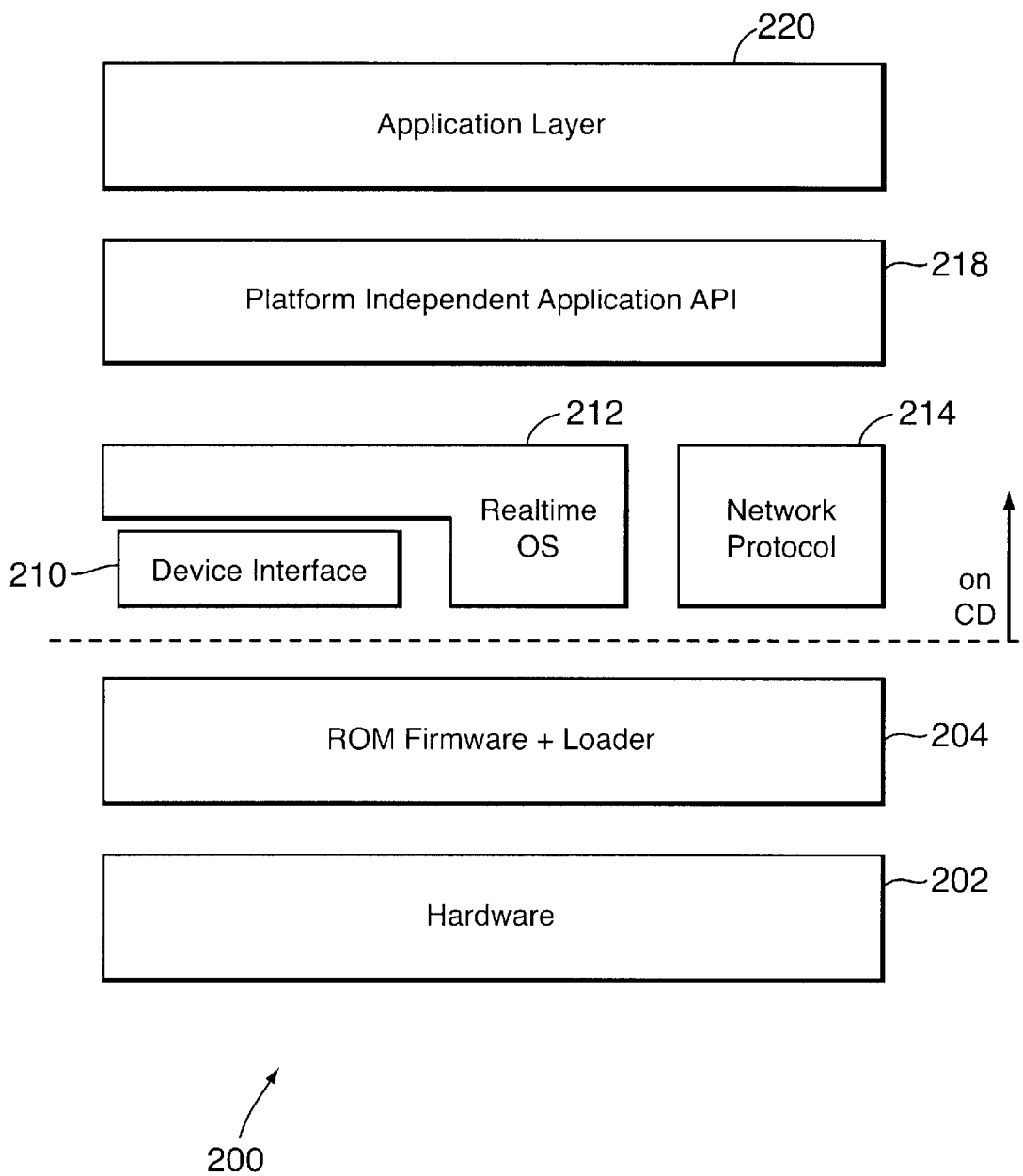
FIG. 3 is a diagram showing a logical architecture view of the present invention.

FIG. 3 is block diagram showing one logical architecture 200 of systems 100 and 140 of FIGS. 1 and 2, respectively. FIG. 3 shows that the software rides on a hardware 202. The software 204 in the ROM contains firmware and a loader. The firmware is used to operate hardware so that the system functions in the desired manner. The loader allows executable programs stored on a VCD to be loaded into the memory. The software recorded on the VCD can be divided into at least three layers. At the lowest layer is platform dependent basic system level software. Examples are device interface 210, a real time operating system ("OS") 212, and network protocols software 214. Device interface 210 is designed to be modular and lightweight to meet specific platform implementation requirements. Realtime OS 212 preferably provides support for any real-time microkernel that includes multi-tasking and multi-threading. Realtime OS 212 could also be a native mode microkernel. The DSP-modification codes are preferably contained in the device interface 210. The boot program could also be included in Realtime OS 212. Alternatively, the boot program could be a separate program at a level below Realtime OS 212. Network protocols software 214 preferably contains portable TCP/IP stack that can work on any microkernel. It should support TCP/IP and can communicate with PPP-based hosts. Riding on top of this basic system level software is a platform independent application programming interface ("API") layer 218. This layer allows applications to communicate with the basic system level software using a platform independent language. The application API provides the basic software infrastructure required to build applications for systems 100 and 140. Software developers can code directly to the application API to create customized applications. The application API includes a graphic library comprising 2D drawing modules, screen and color controls, JPEG and GIF libraries. The application API also includes a font library that supports standard fonts and font styles, and provides anti-aliased characters for display devices (TV, LCD, VGA, etc.). The developer coded applications form an application layer 220. These applications are independent of input and display media; they can output to TV, VGA or LCD screens, and can take input from wired or wireless keyboards, a variety of remote controls and touch screens of other pointing devices that are part of system 140.

In another embodiment of the present invention, the basic system level software (i.e., device interface 210, realtime OS 212, and network protocols software 214) are stored in the ROM.

Figures 4, 5:
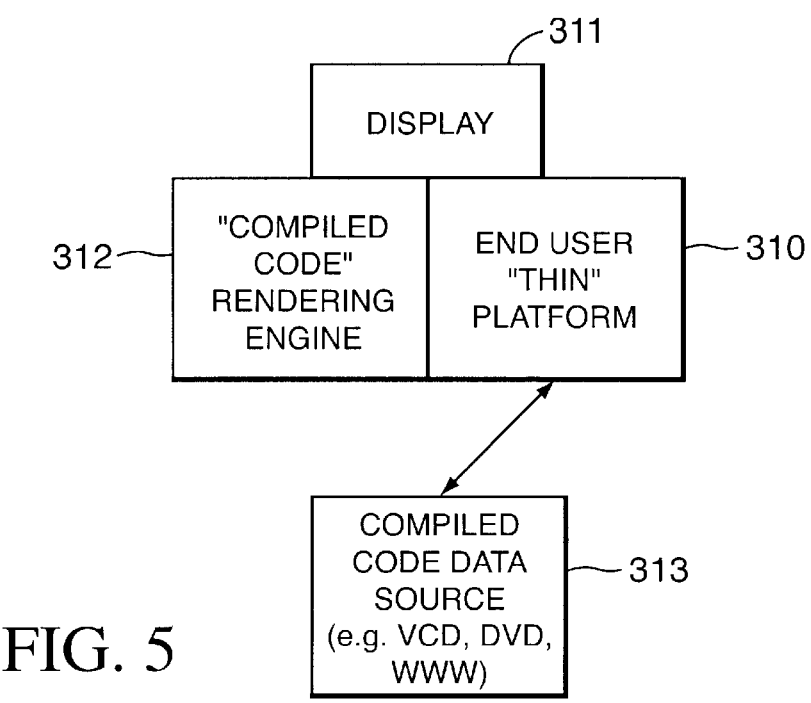
FIG. 4 shows an example of a directory structure in a compact disk of the present invention.
FIG. 5 is a simplified diagram of an end-user thin platform for execution of a compiled code data source according to the present invention.

An example of the directory structure 240 of a loadable VCD is shown in FIG. 4. The directories having names "MPEGAV", "CDDA", SEGMENT", KARAOKE", EXT", and "CDI" are standard directories under the VCD specification promulgated by Philips Consumer Electronics. The director "PROGRAM" is used to store executable programs of the present invention.

More specifically, the PROGRAM section contains a plurality of files called "AUTORUN.EXE", one for each type of system or platform. In that section, a file is provided for a dual processor system of the present invention. Thus, a VCD that is intended to be used on a specific type of player would provided the corresponding AUTORUN.EXE file for execution on the targeted type of system. For example, the VCD shown in FIG. 4 is intended to be used on players using the ESS3210 manufactured by ESS Technology, Inc., the ESS3308 manufactured by the same company, and others. Each of these systems has behavior that can be modified by the included DSP-modification codes in the corresponding AUTORUN.EXE files, where these AUTORUN.EXE files contain programs written using the DSP-modification codes for the corresponding system. The boot program Realtime OS, device interface, network protocol, etc. are preferably included in AUTORUN.EXE or files as designated by the file. The loader program of the present invention is programmed to (i) recognize the model name of its dual processor system, (ii) search for the AUTORUN.EXE file corresponding to this dual processor system, and (iii) load into the specific portion of the RAM the DSP-modification codes in the corresponding AUTORUN.EXE file. Once the AUTORUN.EXE file is loaded into the RAM, the operation of the dual processor system is modified.

Detailed Description of The Translation Process

A detailed description of preferred embodiments of the present invention is provided with respect to FIG. 5 which illustrates a simplified implementation of the present invention. FIG. 5 illustrates a "thin" platform which includes a limited set of data processing resources represented by box 310, a display 311, and a "compiled code" rendering engine 312 for a display oriented language which relies on the data processing resources. The end user platform 310 is coupled to a compiled code data source 313. A compiled code data sources comprises, for example a VCD, or other computer readable data storage device. Alternatively, the compiled code data source 313 may comprises a connection to the World Wide Web or other packet switched or point-to-point network environment from which compiled code data may be retrieved.

The limited data processing resources of the thin platform 310 include for example a microcontroller and limited memory. For example, 512 k of RAM associated with a 8051 microcontroller, or a 66 mhz MIPS RISC CPU and 512 k of dynamic RAM may be used in a representative thin platform. Other low cost microprocessors with limited memory may also be used for the thin platform. In addition, other thin platforms may comprise high performance processors which have little resources available for use in rendering the compiled code data source. Coupled with the thin platform is a compiled code rendering engine 312. This rendering engine 312 is a relatively compact program which runs efficiently on the thin platform. The rendering engine translates the compiled code data source data set into a stream of data suitable for the display 311. In this environment, the present invention is utilized by having the standard HTML or JAVA code preprocessed and compiled into a compiled HTML/JAVA format according to the present invention using the compiler engine described in more detail below on a more powerful computer. The compiled HTML/JAVA codes are saved on the storage media. A small compiled HTML/JAVA run time engine 312 is embedded or loaded into the thin client device. The run time engine 312 is used to play the compiled HTML/JAVA files on the thin platform 310. This enables the use of a very small client to run full feature HTML or JAVA programs. The machine can be used both on-line, off-line or in a hybrid mode.

The compiled file structure is set forth in FIG. 6 and described below. The file structure begins with a ten character string COMPHTML 400. This string is followed by a HTML file header structure 401. After the file header structure, a YUV color palette is set forth in the structure 402 which consists of an array of YUVQUAD values for the target device. After the palette array, a list 403 of HTML information structures follows. Usually the first HTML information structure 404 consists of a title. Next, a refresh element typically follows at point 405 which is optional. Next in the line is a background color and background images if they are used in this image. After that, a list of display elements is provided in proper order. The anchor node for the HTML file is always in front of the nodes that it contains. An animation node is always right before the animation image frames start. The image area nodes usually appear at the head of the list.

The HTML file header structure includes a first value BgColor at point 406 followed by palette size parameters for the target device at point 407. The YUVQUAD values in the color palette consist of a four word structure specifying the U, U, and V values for the particular pixel at points 408–410. The HTML information structures in the list 403 consist of a type field 411, a size field 412, and the information which supports the type at field 413. The type structures can be a HTML_Title, HTML_Text, HTML_Chinese, HTML_Xxage, HTML_Square, HTML_Filled Square, HTML_Circle, HTML_Filled Circle, HTML_Line, HTML, Author, HTML_Animation, etc.

Functions that would enable a thin platform to support viewing of HTML-based content pre-compiled according to the present invention include the following:

General Graphics Functions int DrawPoint (int x, int y, COLOR color, MODE mode);

int DrawLine (int x1, int y1, int x2, int y2, COLOR color, MODE mode);

int DrawRectangle (int x1, int y1, int x2, int y2, COLOR color, MODE mode);

int ClearScreen (COLOR color);

Color Palette int Change YUVColorPalette();

Bitmap Function int GetStringWidth(char *str, int len);

int GetStringHeight(char *str, int len);

int DrawStrigOnScreen(int x, int y, char *str, int len, COLOR color, MODE mode):

Explanation

All (x, y) coordinates are based on the screen resolution of the target display device (e.g. 320×240 pixels).

COLOR is specified as an index to a palette.

MODE defines how new pixels replace currently displayed pixels (COPY, XOR, OR, AND).

Minimum support for DrawLine is a horizontal or vertical straight line, although it would be nice to have support for diagonal lines.

The Change YUVColorPalette function is used for every page.

BitBit uses (x1, y1) and (x2, y2) for scaling but it is not a requirement to have this scaling functionality.

String functions are used for English text output only. Bitmaps are used for Chinese characters.

Figure 7A:
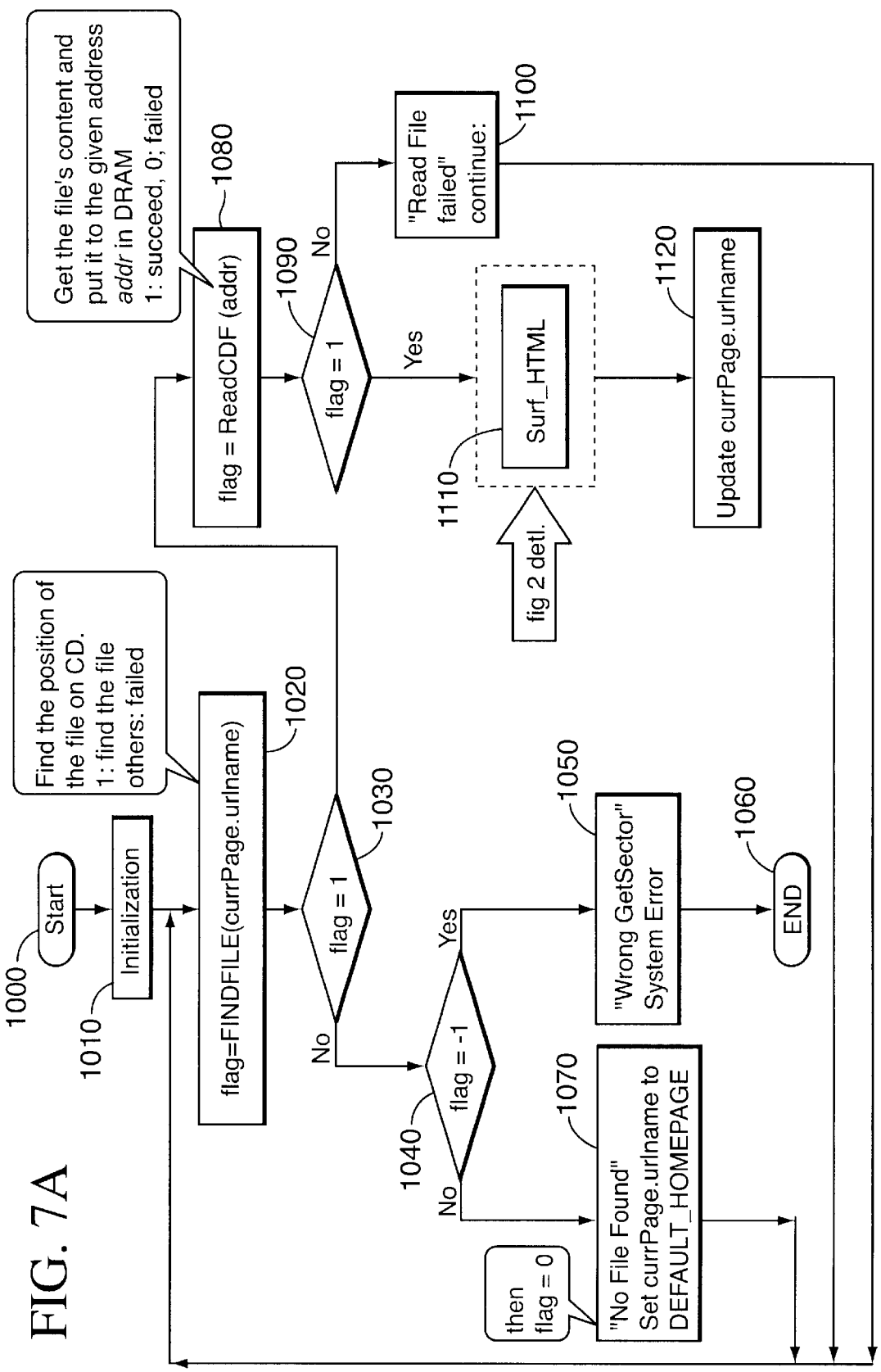
FIGS. 7A–7B illustrate a compiled HTML run time engine for execution of codes on the thin platform according to the present invention.
Figure 7B:
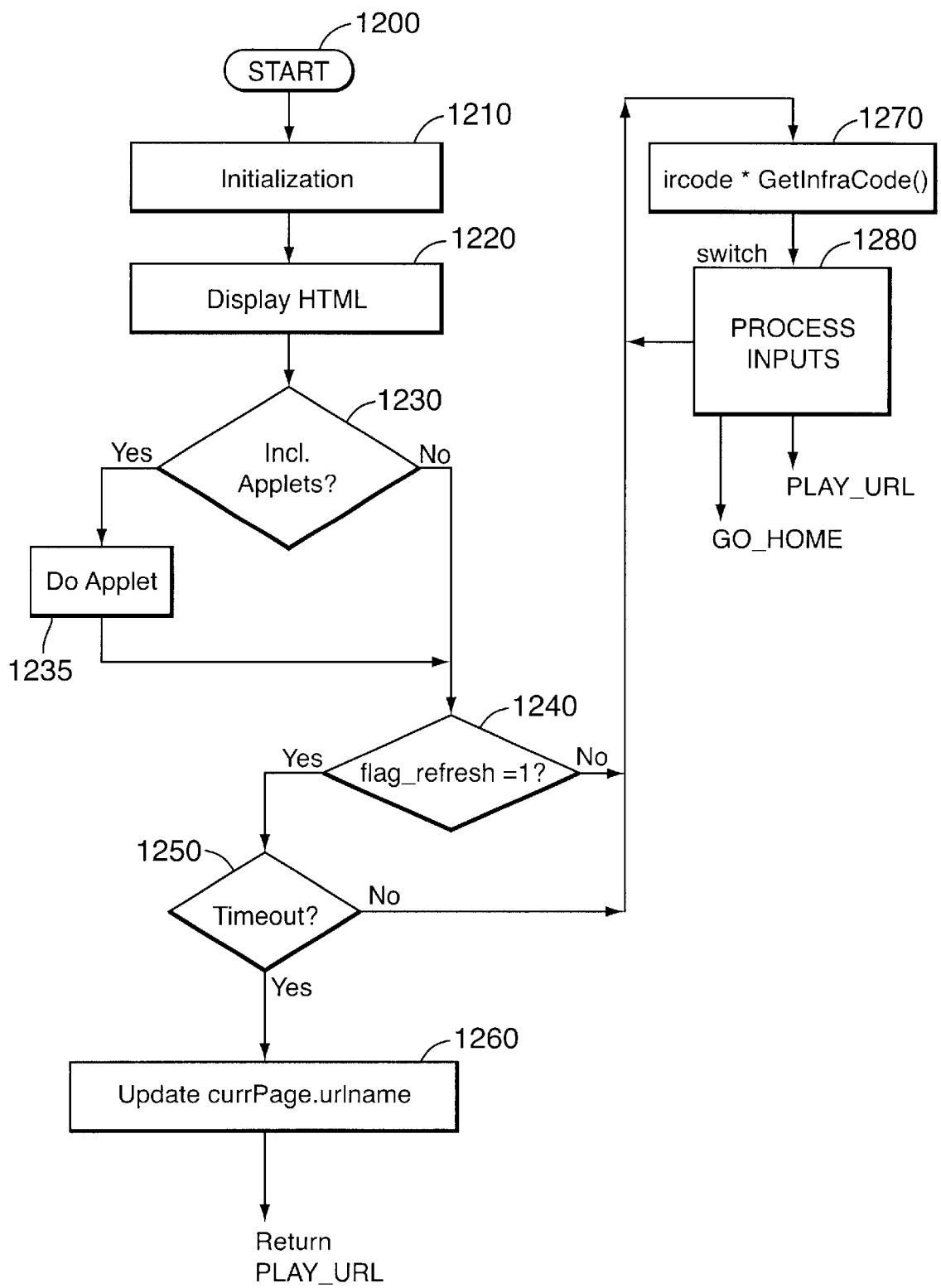

FIGS. 7A and 7B set forth the processing steps for the run time engine suitable for execution on a thin client platform for display of the compiled HTML material which includes the function outlined above in the "display" step 1220 of FIG. 7B.

The process of FIG. 7A starts at block 1000. The run time engine is initialized on the client platform by loading the appropriate elements of the run time engine and other processes known in the art (step 1010). The next step involves identifying the position of the file, such as on the source CD or other location from which the file is to be retrieved and setting a flag (step 1020). The flag is tested at step 1030. If the flag is not set, then the algorithm branches to block 1040 at which the flag is tested to determine whether it is −1 or not. If the flag is −1, then the algorithm determines that a system error has occurred (step 1050) and the process ends at step 1060. If the flag at step 1040 is not −1, then it must be 0 and the file has not been found (step 1070). Thus after step 1070 the algorithm returns to step 1020 to find the next file or retry.

If at step 1030, the flag is set to 1 indicating that the file was found, then the content of the file is retrieved using a program like that in Table 3, and it is stored at a specified address. A flag is returned if this process succeeds set equal to 1 otherwise it is set equal to 0(step 1080). Next the flag is tested (step 1090). If the flag is not equal to 1 then reading of the file failed (step 1100). The process then returns to step 1020 to find the next file or retry.

If the flag is set to 1, indicating that the file has been successfully loaded into the dynamic RAM of the target device, then the "Surf_HTML" process is executed (step 1110). The details of this process are illustrated in FIG. 8B. Next the current page URL name is updated according to the HTML process (step 1120). After updating the current URL name, the process returns to step 1020 to find the next file.

FIG. 7B illustrates the "Surf_HTML" process of step 1110 in FIG. 7A. This process starts at point 1200. The first part is initialization step 1210. A display routine is executed at step 1220 having the fixed coordinate functions of the recompiled HTML data set. First, the process determines whether applets are included in the file (step 1230). If they are included, then the applet is executed (step 1240). If no applets are included or after execution of the applet, then a refresh flag is tested (step 1240). If the flag is equal to 1, then it is tested whether a timeout has occurred (step 1250). If a timeout has occurred, then the current page is updated (step 1260) and the process returns set 1210 of FIG. 7B, for example.

If at block 1240 the refresh flag was not equal to 1, or at block 1250 the timeout had not expired, then the process proceeds to step 1270 to get a user supplied input code such as an infrared input signal provided by a remote control at the target device decode. In response to the code, a variety of process are executed as suites a particular target platform to handle the use inputs (step 1280). The process returns a GO_HOME, or a PLAY_URL command, for example, which result in returning the user to a home web page or to a current URL, respectively. Alternatively the process loops to step 1270 for a next input code.

FIGS. 8A and 8B illustrate the off-line environment for use of the present invention. In FIG. 8A, the production of the compiled files is illustrated. Thus, a standard object file, such as an HTML or JAVA image, is input online 1300 to a compiler 1301 which runs on a standard computer 1302. The output of the compiler on line 1303 is the compiled bitmap, compiled HTML or compiled JAVA formatted file. This file is then saved on a non-volatile storage medium such as a compact disk, video compact disk or other storage medium represented by the disk 1304.

FIG. 8B illustrates the reading of the data from the disk 1304 and a thin client such as a VCD box, a DVD box or a set top box 1302. The run time engine 1306 for the compiled data is provided on the thin platform 1305.

Thus, off-line full feature HTML JAVA processing is provided for run time environment on a very thin client such as a VCD/DVD player. The standard HTML/JAVA objects are pre-processed and compiled into the compiled format using the compiler engine 1301 on a more powerful computer 1302. The compiled files are saved on a storage medium such as a floppy disk, hard drive, a CD-ROM, a VCD, or a DVD disk. A small compiled run time engine is embedded or loaded into the thin client device. The run time engine is used to play the compiled files. This enables fuse of a very small client for running full feature HTML and JAVA programs. Thus, the machine can be used in both online, and off-line modes, or in a hybrid mode.

Detailed Description of the Processing of the Codes in the Intermediate Language The present invention discloses a novel system and method for processing and displaying objects which can be generated from object specifying languages (e.g. HTML and JAVA) to be processed on a platform having minimal computing power and resources. This platform can be a CD, VCD, or DVD player with a CPU having limited computing power and limited amounts of memory.

A presently preferred embodiment of the present invention includes a VCD/DVD player having a CPU and with limited amounts of memory. The player also has a ROM containing instructions for initialization and set-up of the player when it is first powered-up. The home page is specified by a JAVA class file or other initialization file. Once the player starts its operation, it seeks for files to process at a predetermined directory location on the optical disc. Here, FIG. 4 shows the directory structure which is part of the present invention.

Referring to FIG. 4, the novel directory structure includes a root directory having the following subdirectories: MPEGAV, CDDA, SEGMENT, KARAOKE, EXT, CDI, DATA and PROGRAM. Under the DATA subdirectory, there is a VCD_ROM subdirectory, and under the PROGRAM subdirectory, there are the PUB_DATA ESS3210: autorun.exe, ESS3308: autorun.exe, Other Decoder chips: autorun.exe, and JAVA: autorun.exe. Under the PUB_DATA subdirectory, there are the FONT LIBRARY and Other System DATA subdirectories. By providing corresponding autorun programs under the PROGRAM subdirectory, an optical disc play (or player of any type) can be directed to search and retrieve the designated executable file for processing. Or, the designated data file can be retrieved and processed by the player. Here, in the preferred embodiment, the data files are generally stored at a designated place.

Figure 6:
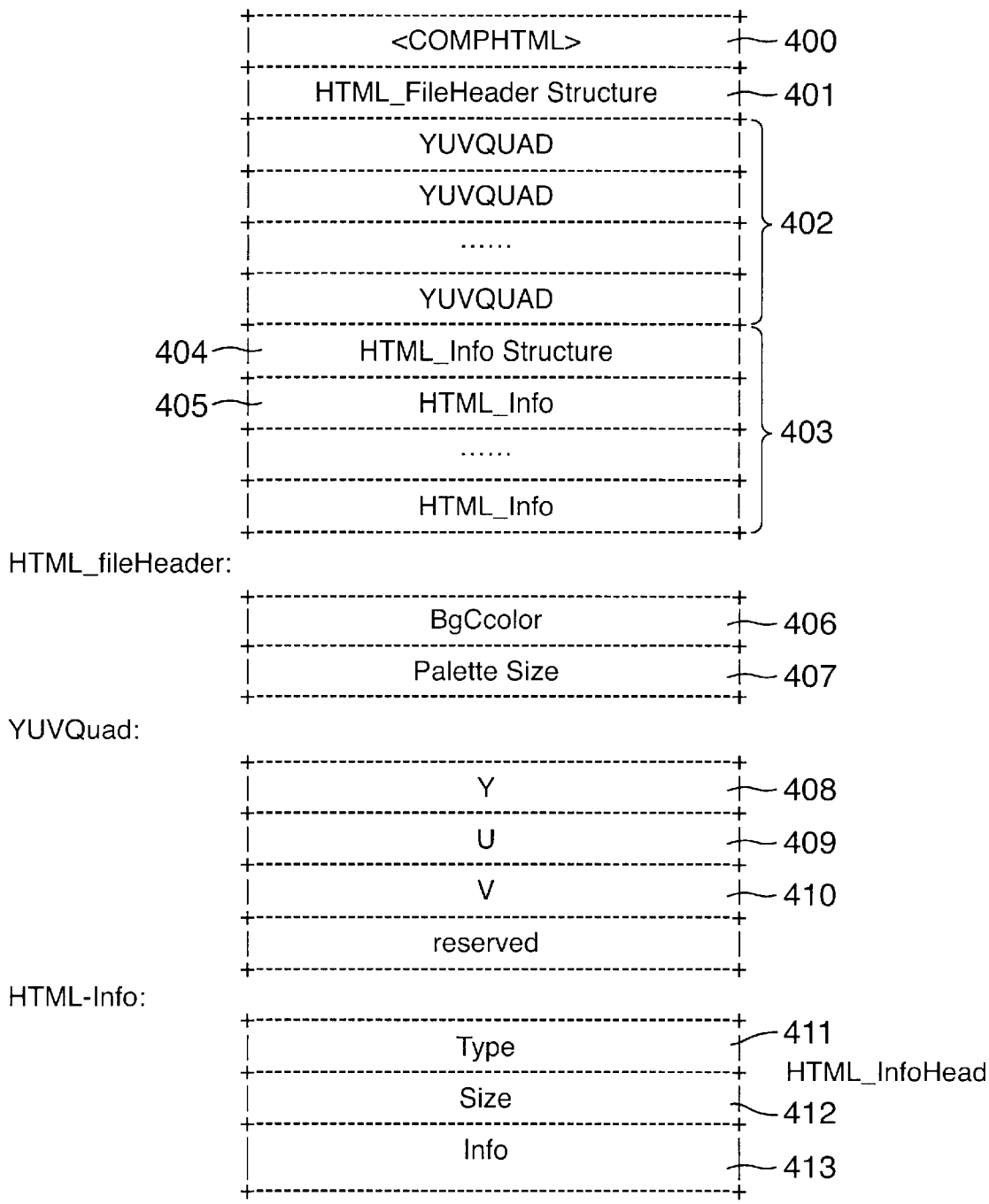
FIG. 6 illustrates the compiled HTML structure according to one embodiment of the present invention.

Referring to FIG. 6, the file structure is also a novel part of the present invention where it begins with a <COMPHTML> tag 900 identifying the file type. This tag is followed by a fileheader structure 901 which provides for the background color 906 and the palette size 907. After the fileheader structure, it is followed by a number of YUVQuad color palettes 902 where each YUVQuad comprises a Y element 908 a U element 909, a V element 910, and a reserved word. The color palettes are followed by a HTML—Info. structure, which is typically a title, and a number of HTML_Info blocks where each block typically includes a type field, a size field, and other information pertinent to this object type. Each of these HTML_Info blocks is processed by the player to display a screen of information.

Referring to FIG. 9, a flow chart illustrating the steps in operating a thin client platform for processing the data files and the data objects is shown. Here, when the machine (thin client platform) starts up, a series of initialization steps are taken to set-up the machine for processing (step 2000). Once the initialization is completed, the predefined file to be retrieved is fetched (step 2002). If the fetching operation is not successful, a flag is set to a value other than 1. If the variable flag equals −1, a system error has occurred and the program terminates or is redirected to other error handling routines (step 2010). If the variable flag equals 0, the specified file is not found on the designated path and a default homepage file is specified (step 2012). The processing flow returns to the top at (step 2004) to retrieve the default homepage file. If the fetching operation is successful as indicated by flag equaling 1 (step 2006), the content of the file is read and placed in memory (step 2014). If this read operation is not successful as indicated by flag not equaling 1 (steps 2016 and 2018), file-read-error handling routine can be applied and the read operation can be retried. If the read operation is successful, the next step (step 2020) is to display a screen of information in accordance with the content of the file which contains codes in the intermediate language. This processing step is further illustrated in FIGS. 20 and 21. After the display of a screen, the next page to be processed is specified accordingly (step 2022) and the corresponding file fetched (step 2004).

Referring to FIG. 10, the operative steps for step 2020 of FIG. 9 is further explained. Here, the content of the file in describing the screen to be displayed is processed (step 2032) to display such information. This step is further explained in FIG. 11. If there are applets to be processed, the applets are processed accordingly (steps 2034 and 2036). If a flag_refresh variable has been set causing the testing for a timeout condition, the timeout condition is checked. If the timeout condition is true, the current page URL name is updated and the content of the URL is played. This is like a default situation where if the user does not make a selection within a certain period of time, a default selection is played. If flag_refresh does not equal 1 or the timeout condition is not true, the infrared code, if one is available, is fetched (step 2044). If there is not an infrared code available, the program continuously tests for the availability of an infrared code (step 2046). If the "1" button is pressed on the remote control causing the generation of an infrared code representing "1", the selection on the screen corresponding to the "1" selection is highlighted (steps 2048 and 2049). This same is true for received infrared code representing "2" to "9", etc. Additionally, an infrared code representing moving forward (step 2052) or moving backward (step 2054) causes the selection to be changed to a forward or backward neighboring selection. If an infrared code is received representing the request for the ejection of the CD, the corresponding routines are executed (step 2058) and the home page is displayed. If an infrared code representing the play function is received, the highlighted selection on the screen will be retrieved and played (step 2060). Here, the processing flow returns to step 2004 of FIG. 10. If an infrared code representing a return request is received (step 2062), the home page is retrieved and displayed.

Referring to FIG. 11, the processing steps for displaying a screen of information based upon the code in the intermediate language is illustrated. The figure corresponds to steps 2030 and 2032 of FIG. 10. At this point, the file containing the code has been read-in and is to be processed to display information on the screen. First, the file header, the palette, and the background color information is read and processed accordingly (step 2070). If the file pointer is not at the end of the file (step 2072), the next object in the file is read (step 2074). Otherwise, if the file is empty, all of the objects in the file have been processed and the step is completed. An object is first identified and it is processed correspondingly. An object can be any one of the defined objects disclosed herein conforming to the corresponding structural type. Or, it can be any additional object conforming to the general concept of the disclosed invention herein. FIG. 11 illustrates some of the object types of one preferred embodiment. After the object is processed, the processing flow returns to step 2072 to find the next object for processing. In this manner, all of the objects in the file are processed and a screen of information is displayed on a monitor.

As part of the intermediate language of the present invention, absolute position in specifying an object is used where the position of the object on the screen is specified by using the screen coordinates (or other coordinates). This is different from JAVA or other object specifying languages where relative position is used where an object is specified relative to another object or objects. The codes in the intermediate language are also portable, meaning that it is processor independent where the codes can be considered as commands and/or data that can be processed or tailored by the specific platform. Each specific platform also uses a graphics driver that is typically stored in the ROM. The graphics driver provides for a number of basic functions that can be called to draw to the screen.

An Alternative Embodiment of the Present Invention

Various aspects of the present invention can be embodied in many alternative forms. In yet another embodiment, a VCD Basic Language is provided for the processing of objects for display. The VCD Basic Language is a simple scripting language allowing a greater amount of interaction between the user and the program and data as specified by the CHM file. It allows the performance of simple math calculation, character operation, graphics operation, display of image files and HTML files, and playing of wave files and video clips. The presently provided VCD Basic can be easily expanded to include additional functionality and features. It can support a number of data types including integer and character data types and it currently supports up to 26 global variables. The total number of lines can be up to 999 lines where there may be multiple statements on a line separated by a delimitator and the line numbers are limited to 65535. Remark (REM) statements are allowed for documentation purposes.

More specifically, a number of relational operators are provided for condition statements such as IF THEN ELSE statements. Branch statements such as GOTO, GOSUB, and RETURN statements and looping statements such as FOR-TO-NEXT and END are provided. For graphics function, commands for clearing the screen, drawing a cursor, a line, a rectangle, and an image are provided. For multimedia function, commands for playing sound and video are provided. This embodiment also includes commands for performing karaoke related functions, including ordering of a play list (SET), the insertion of a video clip in a specific location in the list (INS), the playing of the first video clip in the list (PLAY), and the deletion of a video clip from the play list (DEL). Certain system functions are provided as well, including a random number generator, the system timer, and infrared key code functions.

This VCD Basic language can be set up in several manners. In one method, the VCD Basic program file is prepared and called directly from the CHM or HTML file. In a second method, the VCD Basic program is placed directly into the CHM or HTML file. Detailed specification and illustration of the VCD Basic is attached as appendix A which is part of the present disclosure.

An alternative embodiment of an aspect of the present invention is provided with respect to the format for a CHM (Chinese Hypertext Markup language). This file format includes an identification string, a header section, one or more data packets, a private data packet, and a closing text string. The header section contains information on the authoring tool, the creator, name of the title, user name, screen width and height, background color, palette size and data, and private data. The data packet contains the data to be used by the browser to navigate the information on the disk. Each data packet includes a header identifying the type and size of the packet and the packet data. Data packet types include title, English text object, image object, rectangle frame object, filled rectangle object, line object, anchor object, image map area object, META refresh object, variable object, sound object, script object, and background image object. Data types that may be used include position description, rectangle description, font description, event handler, and operation. A detailed description of the file structure, the data packet types data packet, and illustration thereof are provided in Appendix B which is part of the present disclosure.

The image file for the image data packet type of the alternative embodiment is generally a YUV bitmap having an identifying text string followed by a file header and a bitmap information header, where the data part of the file comprises of a palette and a bitmap. The detailed specification for the image file format is provided as Appendix C which is also part of the present disclosure.

While the present invention has been described with reference to certain preferred embodiments, it is to be understood that the present invention is not to be limited to such specific embodiments. Rather, it is the inventor's intention that the invention be understood and construed in its broadest meaning as reflected by the following claims. Thus, these claims are to be understood as incorporating and not only the preferred embodiment described herein but all those other and further alterations and modifications as would be apparent to those of ordinary skill in the art.

APPENDIX A
| | | |
|---|---|---|
| 2 | VCD BASIC LANGUAGE SPECIFICATION | 31 |
| 3 | GENERAL CHARACTERISTICS OF THE VCD BASIC LANGUAGE | 32 |
| 4 | LANGUAGE SPECIFICATION | 33 |
| 5 | *Multiple Statement Per Line* | *33* |
| 6 | *Documenting a Program* | *33* |
| 7 | *Flow Control* | *33* |
| 8 | *Graphic Function* | *35* |
| 9 | *Multimedia Function* | *37* |
| 10 | *Special System Functions* | *39* |
| 11 | PROGRAM ON VCD BASIC | 40 |

VCD BASIC LANGUAGE SPECIFICATION

VCD BASIC is a simple scripting language, serves as the companion to enable more dynamic and interactive functionality to CHM file. It allows the user to do simple math calculation ( such as +-*/ ), simple char operation, draw graphics, display image files/HTML files, or play wave file/video clips.

*General Characteristics of the VCD BASIC language*

DATA TYPE

Currently, VCD BASIC support two kinds of data type: INT and CHAR.

DEFINITION OF VARIABLES

VCD BASIC only support 26 variables whose name must be one of the single characters from A to Z. Inside the VCD BASIC, all variables are global. So more attention need to be paid when defining variables within VCD BASIC program.

LINE NUMBER

The total number of lines can be up to 999. The line number should be no larger than 65535.

Relational Operators used in Conditions

| RELATIONS | MATH SYMBOL | BASIC SYMBOL |
|---|---|---|
| Equal to | = | = |
| Less Than | < | < |
| Greater Than | > | > |
| Less Than or Equal To | ≤ | < = |
| Greater Than or Equal | ≥ | > = |
| Not Equal To | ≠ | < > |

1  *Language Specification*
2
3  Multiple Statement Per Line
4  :
5  Example:
6      100 X = 4 : Y = 10 : Z=10:GOSUB 150
7
8  Documenting a Program
9  <u>The REM statement</u>
10

| | |
|---|---|
| General Form | REM *statement* |
| Purpose | *Provides for the insertion of comments in a program* |
| Example: | 110 REM Nov. 17, 1997 |
| | 120 REM ****************** |
| | 130 REM test.c for basic testing |
| | 140 REM ****************** |

11

12  Flow Control
13  <u>The IF ... THEN ... ELSE ... statement</u>
14

| | |
|---|---|
| General Form | IF <*expression*> THEN <*statement*> ELSE <*statement*> |
| | or |
| | IF <*expression*> THEN <*statement*> |
| | where expression is a relationship that is either true or false. |
| Purpose: | *If the expression is true, the PC executes the statement following the keyword THEN. If the expression is false, the PC executes the statement following the key word ELSE..* |
| Example: | 110 IF X>90 THEN GOTO 20 |
| | 120 IF Y>100 THEN X=20 ELSE S=100 |
| note | • all statements have to be in the same line |
| | • Don't write more than one Flow Control statement within 1 line. The following statement would not work: |
| | 100 IF ... THEN ... ELSE ... : IF ... THEN ... ELSE ... |
| | • Don't have Flow Control statement inside another Flow Control statement within one line. The following statement would not work: |
| | 100 IF ... THEN ...IF ... THEN ... ELSE ...ELSE |

15

The GOTO statement

| | | |
|---|---|---|
| General Form | GOTO <line number> | |
| Purpose: | *Let the execution of the program to be continued at the specified line number.* | |
| Example: | 240 GOTO 400 | |

THE GOSUB and RETURN statement

| | | |
|---|---|---|
| General Form | GOSUB <line number> | |
| Purpose | *Let the execution of the program to be continued at the specified line number* | |
| Example | 240 GOSUB 400 | |

| | | |
|---|---|---|
| General Form | RETURN | |
| Purpose | *Let the execution of the program return to the first executable statement immediately following the GOSUB statement that referenced it.* | |
| Example | 1700 RETURN | |

\*\* The difference between GOTO and GOSUB is that:
  GOTO will change the execution of the program, and can't use RETURN to go back.
  GOSUB is more like a subroutine, as for GOSUB <line number>, the program at <line number> is the entry of the subroutine, and the RETURN is like the end of this subroutine. After execute RETURN, the execution will go back to the statement that right after the GOSUB statement which referenced this RETURN.

The FOR ... TO ... NEXT ... Statement

| | | |
|---|---|---|
| General Form | FOR <variable> = <initial value> TO <limit value> : NEXT <variable> | |
| Purpose | *Cause the statement between the* FOR *and the* NEXT *statement to executed repeatedly until the value of the* variable *exceeds the* limit value. | |
| Example | 100 FOR I = 20 TO 5\*7<br>100 FOR I = 20 TO 35<br>:::<br>500 NEXT I | |
| note | The increment value is always set to be 1. | |

The End Statement

| | | |
|---|---|---|
| General Form | END *statement* | |
| Purpose | *When executed, the END statement instructs the PC to stop executing the program. While the END statement is not required, it is recommended that you always include one.* | |
| Example | 810 END | |

34

| | | |
|---|---|---|
| 1 | Graphic Function | |
| 2 | Clearing the Screen | |
| 3 | The DRAWCLS statement | |
| 4 | General Form | DRAWCLS *statement* |
| | Purpose: | *Erases all the information on the screen* |
| | Example: | 120 DRAWCLS |
| 5 | | |
| 6 | | |
| 7 | The DRAWCURSOR statement | |
| 8 | General Form | DRAWCURSOR x,y |
| | | *where (x,y) are the coordinates of the top-left point of the cursor;* |
| | Purpose | *Draw a cursor on the screen* |
| | Example | 100 DRAWCURSOR 100,200 |
| | note | programmer don't need to call clear cursor, whenever you call the DRAWCURSOR, the previous cursor will automatically be clear. |
| 9 | | |
| 10 | The DRAWLINE statement | |
| 11 | General Form | DRAWLINE $(x_1,y_1)$ - $(x_2,y_2)$ - $(x_3,y_3)$-..., color, style |
| | | *where $(x_1,y_1)$ $(x_2,y_2)$ and $(x_3,y_3)$, etc are the coordinates of the points;* |
| | | color *is the color index mapping from the current palette;* |
| | | style *determines the type of the line(dashed or solid) to be drawn. ( style parameter is optional).* |
| | Purpose | *Connect points with lines on the screen* |
| | Example | 100 DRAWLINE(50,70)-(90,100) |
| | | 120 DRAWLINE(50,70)-(90,100)-(90,20),2,0 |
| | | 130 DRAWLINE(50,70)-(90,100)-(70,10)-(100,120),2 |
| | | 140 DRAWLINE(50,70)-(90,100)-(70,10),,1 |
| | note | currently we don't support dashed line |
| 12 | | |
| 13 | | |
| 14 | The DRAWRECT statement | |
| 15 | General Form | DRAWRECT $(x_1,y_1)$ - $(x_2,y_2)$, color, style |
| | | *where $(x_1,y_1)$ is the coordinate of the top-left point* |
| | | $(x_2,y_2)$ *is the coordinate of the bottom-right point;* |
| | | color *is the color index mapping from the current palette;* |
| | | style *determines the style of the rectangle.* |
| | | *0: frame rectangle    1: filled rectangle* |
| | Purpose | *Draw a rectangle(framed or filled) on the screen* |
| | Example: | 100 DRAWRECT(50,70)-(90,100) |
| | | 120 DRAWRECT(50,70)-(90,100),200 |
| | | 130 DRAWRECT(50,70)-(90,100),2,1 |

35

|   |   |
|---|---|
|   | 140 DRAWRECT(50,70)-(90,100),,1 |

The DRAWIMAGE statement

| | |
|---|---|
| General Form | DRAWIMAGE filename, x ,y ,mode<br>*where x and y are top-left position of the image to be displayed ;*<br>*mode is the number 0 or 1, which 0 represents Normal mode, 1 Transparent mode.* |
| Purpose | *Display a image specified by filename, at the given position.* |
| Example: | 100 DRAWIMAGE "logo.ybm", X, (Y+10), 0<br>120 DRAWIMAGE "logo.ybm", 100,100<br>130 DRAWIMAGE "logo.ybm", 100,100, |
| NOTE | • *the DRAWIMAGE statement draw the image on the background of its parent CHM file.*<br>• *Currently, transparent image display is not supported.* |

Multimedia Function

The PLAYSOUND statement

| | |
|---|---|
| General Form | PLAYSOUND filename |
| Purpose | *Play a wave file specified by filename* |
| Example: | *100 PLAYSOUND "bipper.wav"* |
| NOTE | *Currently, only 8bit mono 11.025 khz wave file is supported* |

The PLAYVIDEO statement

| | |
|---|---|
| General Form | PLAYVIDEO filename,time1,time2,fname2<br>where filename is the video file to be displayed;<br>time1 is the starting time(mm:ss:ff) of the video file specified by filename<br>time2 is the ending time(mm:ss:ff) of the video file specified by filename<br>fname2 is a CHM file name which is to be displayed after the ending time of time2 |
| Purpose | *Play a video clip specified by filename.*<br>*It would support the user to play part of the video clip specified between time1 and time2.*<br>*And it would also support the user to comes back to some other CHM file specified by fname2 after finished the video clip .* |
| Example: | 100 PLAYVIDEO "MUSIC01.DAT"<br>100 PLAYVIDEO "AVSEQ01.DAT",4500,6000<br>100 PLAYVIDEO "AVSEQ01.DAT",,,"DING.CHM"<br>100 PLAYVIDEO "AVSEQ01.DAT",4500<br>100 PLAYVIDEO "AVSEQ01.DAT",4500,6000,"DING.CHM" |
| NOTE | *filename should be MPEG file, and fname2 should be CHM file.* |

The KARAOKE SET statement

| | |
|---|---|
| General Form | KARAOKE SET x,y<br>where (int.) x is the sequence number in the playlist, y is the number of the video clip in the MPEGAV directory |
| Purpose | *Set the yth Video Clip to be played in the playlist at the position of x..* |
| Example: | 100 KARAOKE SET 2, 4 |
| NOTE | *If currently there is less than x-1 items in the playlist, y will be automatically appended to the last.* |

The KARAOKE INS statement

| | |
|---|---|
| General Form | KARAOKE INS x,y<br>where (int) x is the sequence number in the playlist, y is the number of the video clip in the MPEGAV directory |
| Purpose | *Insert the yth Video Clip into playlist at the position of x* |
| Example: | 100 KARAOKE INS 2, 4 |
| NOTE | *If currently there is less than x-1 items in the playlist, y* |

| | | *will be automatically appended to the last.* |
|---|---|---|

The KARAOKE PLAY statement

| General Form | KARAOKE PLAY |
|---|---|
| | no argument |
| Purpose | *Play the $1^{st}$ video clip in the playlist* |
| Example: | 100 KARAOKE PLAY |
| *NOTE* | |

The KARAOKE DEL statement

| General Form | KARAOKE DEL x |
|---|---|
| | where (int) x is the sequence number in the playlist |
| Purpose | *Delete the xth Video Clip in the playlist.* |
| Example: | 100 KARAOKE DEL 2 |
| *NOTE* | *If currently there is less than x items in the playlist, KARAOKE DEL will do nothing.* |

Special System Functions

RANDOM INTEGER NUMBER

The CALL RAND(l) statement

| General Form | CALL RAND(X) |
|---|---|
| Purpose: | generate a random INT number and assigned it to variable X |
| Example: | 100 CALL RAND(X) |

SYSTEM TIMER

The CALL TIME(X) statement

| General Form | CALL TIME(X) |
|---|---|
| Purpose: | get system clock in unit of 0.1 second and assigned it to variable X |
| Example: | 100 CALL TIME(X) |

The CALL IRKEY(X) Statement

| General Form | CALL IRKEY(X) |
|---|---|
| Purpose | Provides the Remote Key Code that had been pressed on the remote control, and assigned the Code to variable *X* |
| Example | 240 CALL IRKEY(X) |
| note | The list of Remote Key Code was listed below. |

Remote Control Key Definition

| KEY_0 | 0 | PLAY_KEY | 31 |
|---|---|---|---|
| KEY_1 | 1 | STOP_KEY | 32 |
| KEY_2 | 2 | FB_KEY | 34 |
| KEY_3 | 3 | FF_KEY | 35 |
| KEY_4 | 4 | PREVIOUS_KEY | 92 |
| KEY_5 | 5 | NEXT_KEY | 93 |
| KEY_6 | 6 | | |
| KEY_7 | 7 | UP_KEY | 99 |
| KEY_8 | 8 | LEFT_KEY | 100 |
| KEY_9 | 9 | RIGHT_KEY | 101 |
| KEY_PLUS_10 | 10 | DOWN_KEY | 102 |

*PROGRAM on VCD BASIC*

As we have mentioned before, VCD BASIC is a simple scripting language, serves as the companion to enable more dynamic and interactive functionality to CHM file.

A VCD BASIC program is composed of a sequence of lines. Each line contains a unique line number that serves as a label for the statement as shown in Figure1. The line may contain up to 160 characters, although it usually contains considerably fewer.

```
Line        Statement
number
100         xxxxxxxxxxxxxxxxxxxxxxxxxxxxxxxxx
110         xxxxxxxxxxxxxxxxxxxxxxxxxxxxxxx
120         xxxxxxxxxxxxxxxxxxxxxxxxxxxxx
  •         xxxxxxxxxxxxxxxxxxxxxxxxxxx
  •         xxxxxxxxxxxxxxxxxxxxxxxxxxxxxxxxxxx
            Fig.1 The general form of a BASIC program
```

VCD BASIC program can be manipulated in 2 ways.

$1^{st}$, We can compose a pure VCD BASIC program file, and call this file directly from a CHM/HTML file. Please note that all the pure BASIC program file should have the identical extension name CLS. For example:

<A href="math.cls"> Sample VCD BASIC program </A>
<A href="math.cls"> <img src="mathtest.ybm"> </A>
or same as in MAPAREA $2^{nd}$, We can also include a VCD BASIC program inside of the CHM/HTML file. As shown in Fig 2. Scripting language is put between the <SCRIPT> and </SCRIPT>, and will always before </HEAD> within HTML/CHM file.

The scripting language is evoked by Anchor Event, "OnClick / OnLeave / OnEnter" and the number that followed are the line number of the BASIC program. As we can see, blocks of the program will all be put together and share the same variables and line number space, although these program may have no relationship with each other at all. So to program need to be very careful. In the case of Fig3, if program 1 and program2 are independent program, at the beginning of the program it is highly recommended to initialize all the variables that will be used in his program.

```
Example:
<html><body>
<head>  <script language = "VCDSCIPT">
10 ...              //
20 ...              //  program1
30 ...              //
40 END              //

100 ....            //  program 2
120 END             //
</script></head>
...
<A                                  OnClick = "10"
OnLeave = "100">TEST</A>
...
</body></html>
```
Fig 3

Programming Tips:

1. The VCD BASIC language support only 26 single character variables from A to Z, and all its variables are global variables. So the program flow and variables definition need to be carefully designed before the programmer actually writing BASIC codes.

2. All the line number should be aligned sequentially. The following program is wrong:

```
10    xxxxxxxxxxxxxx
20    xxxxxxxxxxxxxx
100   xxxxxxxxxxxxxx
200   xxxxxxxxxxxxxx
30    xxxxxxxxxxxxxx
40    xxxxxxxxxxxxxx
```

3. All the integer should be decimal number, no hex or octal number will be supported on the integer variables assignment.
   For Example:   10 X = 10 (right)
                  10 X = 0xA (wrong)
4. The program should be written in Upper Cases, except it was after REM
5. Limitation of using Multiple Statement per line Statement
   The ':' statement after RETURN , GOTO , GOSUB , NEXT and THEN will not be execute correctly. It is recommended not use ':' after these statement. Use a new line instead.

APPENDIX B

CHM DATA FORMAT SPECIFICATION VERSION 1.0 .................................................................... 42

INTRODUCTION .......................................................................................................................... 43
CHM FILE FORMAT ................................................................................................................... 43
   *CHM Header* ........................................................................................................................ 43
   *CHM Data packets* ............................................................................................................... 44
DATA TYPES USED IN THIS DOCUMENT ..................................................................................... 46
   *Title of CHM page (Type 0)* ................................................................................................. 47
   *English Text Object (Type 1)* ............................................................................................... 47
   *Image Object (Type 3)* ......................................................................................................... 48
   *Rectangle Outline Object (Type 4)* ...................................................................................... 49
   *Filled Rectangle Object (Type 5)* ......................................................................................... 49
   *Line Object (Type 8)* ............................................................................................................ 49
   *Anchor Object (Type 9)* ....................................................................................................... 50
   *Refresh Object (Type 13)* ..................................................................................................... 51
   *Image Map Area Object (Type 11)* ...................................................................................... 51
   *Variable Object (Type 14)* ................................................................................................... 52
   *Background Sound Object (Type 15)* ................................................................................... 52
   *Script Object (Type 16)* ....................................................................................................... 53
   *Background Image Object (Type 17)* .................................................................................. 53

CHM data format specification        Version 1.0

Introduction

All two and four byte integers are represented in the big endian format.
All text strings are terminated with a null character (\0) and padded to be 4-byte boundary.

CHM file format

The CHM file has the following general form at . An identifying text string, followed by a header and multiple data packets terminated by a private data packet and a closing text string.

```
<COMPHTML>
CHM header
CHM data packet
CHM data packet
. . . . . . . .
CHM data packet
Unknown data package
</COMPHTML>
```

| offset | number of bytes | content |
|---|---|---|
| 0 | 12 | <COMPHTML>, 0x00, 0x00 |
| 12 | 144 + palette size | CHM header |
|  | <variable size> | CHM data packet |
|  |  | ............. |
|  | <variable size> | CHM data packet |
|  | 12 | Unknown data package |
|  | 12 | </COMPHTML>, 0x00 |

Table 1:        CHM File overview

<COMPHTML>
   The "magic" text identifier string

CHM header
   The CHM header containing global information

CHM data packet
   The packets of data that make up the Compiled HTML structures Private data
   Data area reserved for use by the authoring tool </COMPHTML>
   The "magic" text string that signals the end of the file CHM Header The header contains the information about the authoring tool, its creator and the source material.
The browser uses the palette information to build a new palette that will be used in the context of the CHM file.

| Offset | number of bytes | content |
|---|---|---|
| 12 | 24 | authoring tool information |
| 36 | 8 | version |
| 44 | 64 | name of title |
| 108 | 32 | user name |
| 140 | 4 | screen width |
| 144 | 4 | screen height |
| 148 | 4 | background color |
| 152 | 4 | palette size (N) |
| 156 | 64 | private data |
| 212 | 4*N | palette data |

Table 2: CHM Header

```
authoring tools information
    Text string that describes the tool used to create the CHM file version information
    The version of the CHM file name of title
    The title of the CHM page user name
    The creator of the CHM file screen width
    The width of the source material in pixels screen height
    The Height of the source material in pixels background color
    The index into the palette to be used as the background for this CHM page palette size
    The size of the palette used in the CHM file private data bytes
    Data to be used by the creators/content owners of the page palette data
    The <palette size> YUV entries of the palette
```

CHM Data packets

The data packets contain the data to be used by the browser to navigate the information on the disk. A CHM data packet has the following format: A header followed by the data. The header contains the type and the size of the packet following the header.

| offset | number of bytes | content |
|---|---|---|
| 0 | 4 | CHM data type |
| 4 | 4 | size |
| 8 | 4 | checksum |
| 12 | N | data packet |

Table 3: CHM Data Packet structure data type
  The type of the CHM data packet. The types are listed in the CHM Data type table.

size
  The size of the data packet in byte excluding the header.

checksum
  The checksum according to an algorithm to be specified.

data packet
  The data of the CHM packet

| data type | data content |
|---|---|
| 0 | Title of the html page |
| 1 | English Text object |
| 2 | reserved |
| 3 | Image Object |
| 4 | Rectangle Frame Object |
| 5 | Filled Rectangle Object |
| 6 | reserved |
| 7 | reserved |
| 8 | Line Object |
| 9 | Anchor Object |
| 10 | reserved |
| 11 | Image Map Area Object |
| 12 | reserved |
| 13 | META Refresh Object |
| 14 | Variable Object |
| 15 | Sound object |
| 16 | Script object |
| 17 | Background Image object |

Table 4: CHM Data Packet types

1 Data Types used in this document
2 Position description data structure

| offset | number of bytes | content |
|---|---|---|
| 0 | 4 | x-coordinate in pixels |
| 4 | 4 | y-coordinate in pixels |

3
4 Rectangle description data structure

| offset | number of bytes | content |
|---|---|---|
| 0 | 8 | top-left coordinate |
| 8 | 8 | bottom-right coordinate |

5
6 Font description data structure

| offset | number of bytes | content |
|---|---|---|
| 0 | 64 | font name description |
| 64 | 4 | font size |
| 68 | 4 | font shape (bold) |
| 72 | 4 | font shape (italic) |
| 76 | 4 | font shape (underline) |
| 80 | 4 | font shape (strikeout) |

7
8 Event Handler structure

| offset | number of bytes | content |
|---|---|---|
| 0 | 16 | ONENTER event handler |
| 16 | 16 | ONLEAVE event handler |
| 32 | 16 | ONCLICK event handler |

9
10 Operations data structure

| offset | number of bytes | content |
|---|---|---|
| 0 | 8 | result string |
| 8 | 8 | input string 1 |
| 16 | 4 | operator flag |
| 20 | 8 | input string 2 |

11

Title of CHM page (Type 0)

This gives the title of the HTML page. It was used by bookmark function. Currently, only English text description of page title are accepted.

| offset | number of bytes | content |
|---|---|---|
| 0 | 12 | packet header |
| 12 | 4 | length |
| 16 | N | text | length
　　The length of the title in bytes excluding the null character text
　　The title text string English Text Object (Type 1)

| offset | number of bytes | content |
|---|---|---|
| 0 | 12 | packet header |
| 12 | 8 | coordinate |
| 20 | 4 | anchor ID |
| 24 | 84 | font type |
| 108 | 4 | text color |
| 112 | 4 | text length |
| 116 | N | text | coordinate
　　The bottom left coordinate of the text string anchor ID
　　The ID of the anchor used to highlight and "click" on the text font type
　　The type of the font to draw the text text color
　　The index into the color palette for drawing the text text length
　　The length of the text character string excluding the null character text
　　The text string to be drawn at the (x,y) coordinates
　　The characters supported : (from space to ~)
　　space ! " # $ % & ' ( ) * + - . / 0 1 2 3 4 5 6 7 8 9 : ; , < = > ? @ A B
C D E F G H I J K L M N O P Q R S T U V W X Y Z \ ] ^ _ ` a b c d e f g h i j
k l m n o p q r s t u v w x y z { | } ~

Image Object (Type 3)

| offset | number of bytes | content |
|---|---|---|
| 0 | 12 | packet header |
| 12 | 8 | coordinate |
| 20 | 8 | width and height |
| 28 | 4 | anchor ID |
| 32 | 4 | reserved |
| 36 | 4 | reserved |
| 40 | 64 | map name |
| 104 | 4 | reserved |
| 108 | 4 | image file name length |
| 112 | N | image file name | coordinate
 The top left coordinate of the image width and height
 The width and height of the image anchor ID
 The ID of the anchor used to highlight and "click" on the characters map name
 The name of the client side image map color
 The index into the color palette for drawing the characters image file name length
 The number of characters in the image file name excluding the null character image file name
    The image file name

Rectangle Outline Object (Type 4)

| offset | number of bytes | content |
|---|---|---|
| 0 | 12 | packet header |
| 12 | 16 | rectangle coordinates |
| 28 | 4 | color | rectangle coordinates
   The top left and bottom right coordinates of the rectangle outline color
   The index into the color palette for drawing the outline

Filled Rectangle Object (Type 5)

| offset | number of bytes | content |
|---|---|---|
| 0 | 12 | packet header |
| 12 | 16 | rectangle coordinates |
| 28 | 4 | color | rectangle coordinates
   The top left and bottom right coordinates of the rectangle outline color
   The index into the color palette for drawing the outline

Line Object (Type 8)

| offset | number of bytes | content |
|---|---|---|
| 0 | 12 | packet header |
| 12 | 8 | coordinate 1 |
| 12 | 8 | coordinate 2 |
| 16 | 4 | style (NOT USED) |
| 20 | 4 | color | coordinate 1
   The start point of the line coordinate 2
   The end point of the line style
   The drawing style of the line (NOT USED)

color
   The index into the color palette for drawing the line

Anchor Object (Type 9)

| offset | number of bytes | content |
|---|---|---|
| 0 | 12 | packet header |
| 12 | 4 | anchor ID |
| 16 | 4 | overlay |
| 20 | 48 | event handlers |
| 68 | 4 | number of operations |
| 72 | 168 | operations |
| 240 | 4 | URL length |
| 244 | N | URL | anchor ID
    The ID of this anchor to which English and Chinese text anchor refer to.

overlay
    If the overlay value is one the background image will be preserved and the new image will be put on top of it.

event Handler
    See the event handler data structure number of operations
    Number of CHM operations present in the operations field operations
    The operation executed after the selection of the anchor URL length
    The length of the URL string excluding the null character URL
    The URL string Image Map Area Object (Type 11)

| offset | number of bytes | content |
|---|---|---|
| 0 | 12 | packet header |
| 12 | 64 | image map name |
| 76 | 4 | overlay |
| 80 | 48 | event handlers |
| 128 | 4 | number of operations |
| 132 | 168 | operations |
| 300 | 4 | shape |
| 304 | 4 | number of vertices of shape ( N ) |
| 308 | 4 | length of referenced URL name ( M ) |
| 312 | 8*N | coordinates of shape |
| 312+8*N | M | URL name | image map name
   The name of the image to which the map belongs.

overlay
   If the overlay value is one the background image will be preserved and the new image will be put on      top of it.

event handlers
   See the event handler data structure number of operations
   Number of CHM operations present in the operations field operations
   The operation executed after the selection of the map URL length
   The length of the URL string excluding the null character URL
   The URL string Refresh Object (Type 13)

| offset | number of bytes | content |
|---|---|---|
| 0 | 12 | packet header |
| 12 | 4 | delay time in seconds |
| 16 | 4 | number of operations |
| 20 | 168 | operations |
| 188 | 4 | URL length1 (N1) |
| 192 | 4 | URL length2 (N2) |
| 196 | N | URL ( N = N1 + N2 ) | delay
    The time in seconds before the operations will be executed number of operations
    Number of CHM operations present in the operations field operations
    The operation executed after the selection of the map URL length1
    The length of the first URL string referring the original URL name excluding the null character URL length2
    The length of the second URL string referring the overlay URL name excluding the null character URL
    The URL strings terminated with a null character.

Variable Object (Type 14)

| offset | number of bytes | content |
|---|---|---|
| 0 | 12 | packet header |
| 12 | 8 | coordinate |
| 20 | 8 | variable name | coordinate
    The bottom left coordinate of the text string that prints the value of the variable variable name
    The name string of the variable which value will be displayed Background Sound Object (Type 15)

| offset | number of bytes | content |
|---|---|---|
| 0 | 12 | packet header |
| 12 | 4 | number of loops |
| 16 | 4 | length of sound file name |
| 20 | N | sound file name | number of loops
   The number of loops the clip should be played (-1 means forever)

length of sound file name
   The length of the sound file name sound file name
   The name of the WAV file to be played Script Object (Type 16)

| offset | number of bytes | content |
|---|---|---|
| 0 | 12 | packet header |
| 12 | 20 | language ID |
| 32 | 4 | length of script |
| 36 | N | script | language ID
The scripting language ID. Valid IDs is VCDSCRIPT length of script
The length of the script in bytes script
The script to be executed or parsed.

Background Image Object (Type 17)

| offset | number of bytes | content |
|---|---|---|
| 0 | 12 | packet header |
| 12 | 4 | length of image file name |
| 16 | N | image file name | length of image file name
   The length of the sound file name image file name
   The name of the image file to be loaded. The background image is a file that can be shared when drawing various text screens.

APPENDIX C

| | | |
|---|---|---|
| | YBM DATA FORMAT SPECIFICATION VERSION 1.0 | 54 |
| | INTRODUCTION | 55 |
| | YBM FILE FORMAT | 55 |
| | *bitmap file header (16 bytes)* | *56* |
| | *bitmap info header (40 bytes)* | *57* |
| | *Palette* | *58* |

YBM data format specification    Version 1.0

Introduction

All two and four byte integers are represented in the big endian format.
All text strings are terminated with a null character (\0) and padded to be 4-byte boundary.

YBM file format

The YBM file contains a picture in a YUV Bitmap format and has the following general format. An identifying text string, followed by a file header and a bimap info header, the data part of the file consists of a palette and a bitmap.

```
<YUVBMP>1.02B
YBM bitmap file header
YBM bitmap info header
YBM palette
YBM bitmap data
</YUVBMP>
```

| offset | number of bytes | content |
|---|---|---|
| 0 | 16 | <YUVBMP>1.02B,0x00 |
| 16 | 16 | bitmap file header |
| 32 | 40 | bitmap info header |
| 72 | 256*4=1024 | palette |
|  |  | bitmap data |
|  | 12 | </YUVBMP>, 0x00 |

Table 1: YBM File overview

Members

`<YUVBMP>1.02B`
    The "magic" text identifier string followed by a version number. The text string is terminated by a null-character.

`bitmap file header`
    The header containing information about the file

`bitmap info header`
    The header containing information about the CLUT and bitmap data `palette`
    The palette or Color Look Up Table CLUT `</YUVBMP>`
    The "magic" text string that signals the end of the file Bitmap file header (16 bytes)

| offset | number of bytes | content |
|--------|-----------------|---------|
| 16 | 2 | bfType |
| 18 | 4 | bfSize |
| 22 | 4 | reserved1 |
| 26 | 4 | bfOffBits |
| 30 | 2 | reserved2 |

The BITMAPFILEHEADER structure contains information about the type, size, and layout of a file that contains a device-independent bitmap (DIB).

Members bfType
  Specifies the file type. It must be BM.

bfSize
  Specifies the size, in bytes, of the bitmap file.

BfReserved1
  Reserved; must be zero.

bfOffBits
  Specifies the offset, in bytes, from the BITMAPFILEHEADER structure to the bitmap bits.

BfReserved2
  Reserved; must be zero.

Bitmap info header (40 bytes)

| offset | number of bytes | content |
|---|---|---|
| 32 | 4 | biSize |
| 36 | 4 | biWidth |
| 40 | 4 | biHeight |
| 44 | 2 | biPlanes |
| 46 | 2 | biBitCount |
| 48 | 4 | biCompression |
| 52 | 4 | biSizeImage |
| 56 | 4 | biXPelsPerMeter |
| 60 | 4 | biYPelsPerMeter |
| 64 | 4 | biClrUsed |
| 68 | 4 | biClrImportant |

The BITMAPINFOHEADER structure contains information about the dimensions and color format of a device-independent bitmap (DIB).

Members biSize
    Specifies the number of bytes required by the structure.

biWidth
    Specifies the width of the bitmap, in pixels.

biHeight
    Specifies the height of the bitmap, in pixels.

biPlanes
    Specifies the number of planes for the target device. This value must be set to 1.

biBitCount
    Specifies the number of bits per pixel. This value must be set to 8.

biCompression
    Specifies the type of compression for the bitmap.

biSizeImage
    Specifies the size, in bytes, of the image.

biXPelsPerMeter
    Specifies the horizontal resolution, in pixels per meter, of the target device for the bitmap. An application can use this value to select a bitmap from a resource group that best matches the characteristics of the current device.

biYPelsPerMeter
    Specifies the vertical resolution, in pixels per meter, of the target device for the bitmap.

1   biClrUsed
2       Specifies the number of color indices in the color table that are
3       actually used by the bitmap. If this value is zero, the bitmap uses the
4       maximum number of colors corresponding to the value of the biBitCount
5       member for the compression mode specified by biCompression.

6       If biClrUsed is nonzero, the biClrUsed member specifies the actual
7       number of colors the graphics engine or device driver accesses.

8   biClrImportant
9       Specifies the number of color indices that are considered important for
10      displaying the bitmap. If this value is zero, all colors are important.
11

12  Palette
13  Palette consists of 256 YUVQUAD colors.
14  The first 16 colors will be fixed. They are listed below. (Authoring tool will garantee it)
15  {0,0,0}, {0,0,255}, {0,255,0}, {0,255,255}, {255,0,0}, {255,0,255},{255,255,0},
16  {255,255,255},{128,128,128},{192,192,192},{0,0,128},{0,128,0},{0,128,128},
17  {128,0,0},{128,0,128},{128,128,0}
18  The structure of YUVQUAD is listed below:

| number of bytes | content |
|---|---|
| 1 | yuvReserved |
| 1 | yuvY |
| 1 | yuvU |
| 1 | yuvV |

19
20

What is claimed is:

1. A method for decoding codes in a data file representative of a screen of information and hypertext selections, the codes being in a simplified intermediate object-specification language generated from codes originally described in Hyper Text Mark-up Language, said simplified intermediate object-specification language being conducive for processing on a minimal featured hardware platform having a removable media player and one or more processors for processing codes in said simplified intermediate object-specification language, comprising the steps of:

a. retrieving a predesignated data file on a removable media containing codes describing objects in an intermediate language format, wherein said intermediate language format provides for description of objects by specifying object type, object size, and object information;

b. retrieving an object from said file;

c. identifying the object type of said retrieved object;

d. processing said object in accordance with the object type of said object; and e. repeating steps b through d until all objects in said file are processed.

2. A method as recited in claim 1 wherein file header information is read from said file and processed before step b.

3. A method as recited in claim 1 wherein said file includes codes written in a scripting language.

4. A method as recited in claim 3 wherein said processing step further includes the step of processing said codes in said scripting language.

5. A method as recited in claim 4 wherein the processing of said codes in said scripting language is event-driven.

6. A method as recited in claim 3 wherein said file includes references to files containing codes written in a scripting language.

7. A method as recited in claim 6 wherein said processing step further includes the step of processing said codes in said scripting language.

8. A method as recited in claim 7 wherein the processing of said codes in said scripting language is event-driven.

9. A method as recited in claim 1 wherein the objects in said intermediate language format includes text object, image object, line object, rectangle object, anchor object, refresh object, image map area object, variable object, and sound object.

10. A method as recited in claim 1 wherein said method is applied in a system having dual processors.

11. A method as recited in claim 10 wherein said method is applied in a system having a CPU and a DSP processor.

12. A system for processing one or more data files each including codes, each data file having a number of data objects therein, to generate one or more screens of information and hypertext selections on a monitor, where a selection on a screen of information and hypertext selections corresponds to another data file which upon being selected is again processed to generate a second screen of information and hypertext selections, comprising:

a reader for reading data files stored on a medium, each of said data files including codes written in a simplified intermediate object specification language generated from codes originally described in a hypertext markup language each of said data files containing a number of data objects described in an intermediate language format, each said object describing one aspect of a screen of information and hypertext selections;

a CPU means for processing each of the data files and data objects;

ROM memory for storing information for setting up said system;

RAM memory of minimal size sufficiently large for dynamically storing a particular one of said data files;

interacting means for receiving user inputs;

a monitor for displaying a screen of information and hypertext selections;

bus means for permitting communication between said reader, said CPU means, said ROM memory, said RAM memory, said interacting means and said monitor; and wherein upon powering-up a screen of information and hypertext selections are displayed on said monitor for selection and upon receiving a particular selection the corresponding data file to said particular selection and data objects therein are processed to display another screen of information and hypertext selections.

13. A system as recited in claim 12 where said reader is a VCD reader.

14. A system as recited in claim 12 where said reader is a DVD reader.

15. A system as recited in claim 12 wherein said file includes codes written in a scripting language.

16. A system as recited in claim 15 wherein said file includes references to files containing codes written in said scripting language.

17. A system as recited in claim 16 wherein said codes in said scripting language are processed in displaying a screen of information and hypertext selection.

18. A system as recited in claim 17 wherein the processing of said codes in said scripting language is event-driven.

19. A system as recited in claim 15 wherein said file includes codes written in said scripting language.

20. A system as recited in claim 19 wherein said codes in said scripting language are processed in displaying a screen of information and hypertext selection.

21. A system as recited in claim 20 wherein the processing of said codes in said scripting language is event-driven.

22. A method for retrieving and processing a data file and data objects therein representative of a screen of information said file including codes written in a simplified intermediate object specification language generated from codes originally described in a hypertext markup language, comprising the steps of:

a) retrieving a designated data file having a header structure and one or more information objects, each of said objects being described in an intermediate object format and being of a particular type and size, and having information pertinent to the particular object type, said data file being stored on a directory structure in a pre-designated subdirectory under the root directory of an available medium;

b) retrieving and processing said header structure;

c) retrieving a data object from said data file;

d) identifying the object type of said retrieved data object;

e) processing said identified data object in accordance with the object type of said identified data object;

f) repeating steps "c" through "e" until all objects in said file are processed and a screen of information and selection is displayed for selection, each selection corresponding to another data file on said medium;

g) receiving a user-input code representative of a user selection corresponding to a particular selection available on said screen of information and selection;

h) designating a data file corresponding to said particular selection; and i) repeating steps (a) through (h).

23. A method as recited in claim 22 wherein said file includes codes written in a scripting language.

24. A method as recited in claim 23 wherein said processing step further includes the step of processing said codes in said scripting language.

25. A method as recited in claim 24 wherein the processing of said codes in said scripting language is event-driven.

26. A method as recited in claim 23 wherein said file includes references to files containing codes written in a scripting language.

27. A method as recited in claim 26 wherein said processing step further includes the step of processing said codes in said scripting language.

28. A method as recited in claim 27 wherein the processing of said codes in said scripting language is event-driven.

* * * * *

UNITED STATES PATENT AND TRADEMARK OFFICE
CERTIFICATE OF CORRECTION

PATENT NO. : 6,263,344 B1  
APPLICATION NO. : 09/156962  
DATED : July 17, 2001  
INVENTOR(S) : Wu et al.

It is certified that error appears in the above-identified patent and that said Letters Patent is hereby corrected as shown below:

In the Drawings

In Fig. 7A, Sheet 6 of 11, above Tag "1080", in Line 4, delete "1: succeed, 0; failed" and insert -- 1: succeed; 0: failed --, therefor.

In Fig. 8A, Sheet 8 of 11, for Tag "1301", in Line 1, delete "Complier" and insert -- Compiler --, therefor.

In Fig. 8B, Sheet 8 of 11, for Tag "1305", in Line 2, delete "SETTUP ETC." and insert -- SETTOP ETC. --, therefor.

In Fig. 10, Sheet 10 of 11, delete "  ", therefor.

In the Specification

In Column 1, Line 13, delete "Platforms" filed on Sep. 3, 1997, bearing Ser. No. 08/922,898 now U.S. Pat. No. 5,987,256; and to a second regular US application entitled Compact Disc Controllable Machines Containing a Dual Processing System" filed on Sep. 2, 1997, bearing Ser. No. 08/922,064 now abandoned; and to a provisional application entitled "Method and Apparatus for Processing Hypertext Objects on Thin Client Platforms Including DVD/VCD Players", filed on Sep. 18, 1997 bearing file No. 60/059,580." and insert -- Platforms", filed on Sep. 3, 1997, bearing Ser. No. 08/922,898, now U.S. Pat. No. 5,987,256; and to a second regular US application entitled "Compact Disc Controllable Machines Containing a Dual Processing System", filed on Sep. 2, 1997, bearing Ser. No. 08/922,064 now abandoned; and to a provisional application entitled "Method and Apparatus for Processing Hypertext Objects on Thin Client Platforms Including DVD/VCD Players", filed on Sep. 18, 1997, bearing file No. 60/059,580. --, therefor.

Signed and Sealed this  
Eleventh Day of June, 2013

Teresa Stanek Rea  
*Acting Director of the United States Patent and Trademark Office*

CERTIFICATE OF CORRECTION (continued)

U.S. Pat. No. 6,263,344 B1

In the Specification

In Column 2, Line 44, delete "the" and insert -- the figures --, therefor.

In Column 3, Lines 3-15, delete "FIG. 8B.........for example." and insert -- FIG. 8B illustrates the off-line environment in which the stored data is executed by the thin platform. --, therefor.

In Column 6, Line 18, delete "SEGMENT", KARAOKE", EXT"," and insert -- "SEGMENT", "KARAOKE", "EXT", --, therefor.

In Column 7, Line 45, delete "U, U, and V" and insert -- Y, U, and V --, therefor.

In Column 8, Line 2, delete "DrawStrigOnScreen" and insert -- DrawStringOnScreen --, therefor.

In Column 8, Line 61, delete "(step 1240)." and insert -- (step 1235). --, therefor.

In Column 9, Line 24, delete "1302." and insert -- 1305. --, therefor.

In Column 10, Line 15, delete "908" and insert -- 908, --, therefor.

In Column 10, Line 17, delete "HTML-Info." and insert -- HTML_Info --, therefor.

In Column 12, Line 2, delete "delimitator" and insert -- delimiter --, therefor.

In Column 34, Line 4, delete ""VCDSCIPT">" and insert -- "VCDSCRIPT"> --, therefor.

In Column 51, Line 8, delete "put on     top of it." and insert -- put on top of it. --, therefor.

In Column 53, Line 8, delete "put on     top of it." and insert -- put on top of it. --, therefor.

In the Claims

In Column 69, Line 64, in Claim 12, delete "language" and insert -- language, --, therefor.

In Column 70, Line 42, in Claim 22, delete "information" and insert -- information, --, therefor.